US006988095B1

(12) United States Patent  
Dorfman

(10) Patent No.: US 6,988,095 B1  
(45) Date of Patent: Jan. 17, 2006

(54) SYSTEMS AND METHODS FOR PERFORMING PARAMETRIC SEARCHES

(75) Inventor: Andrew S. Dorfman, Bayport, NY (US)

(73) Assignee: Hearst Business Communications, Inc., Garden City, NY (US)

( * ) Notice: Subject to any disclaimer, the term of this patent is extended or adjusted under 35 U.S.C. 154(b) by 274 days.

(21) Appl. No.: 09/850,556

(22) Filed: May 7, 2001

(51) Int. Cl.  
*G06F 7/00* (2006.01)

(52) U.S. Cl. .................. 707/3; 707/102; 707/104.1

(58) Field of Classification Search ............. 709/218, 709/223, 224; 715/513, 501.1; 707/1–10, 707/100–102, 104.1  
See application file for complete search history.

(56) References Cited

U.S. PATENT DOCUMENTS

| | | | | |
|---|---|---|---|---|
| 4,879,648 | A | | 11/1989 | Cochran et al. ............. 364/300 |
| 5,210,868 | A | | 5/1993 | Shimada et al. ............ 395/600 |
| 5,715,444 | A | | 2/1998 | Danish et al. .............. 395/604 |
| 5,860,005 | A | * | 1/1999 | Inoue ......................... 717/101 |
| 5,884,309 | A | * | 3/1999 | Vanechanos, Jr. ............. 707/10 |
| 5,897,639 | A | * | 4/1999 | Greef et al. ............. 707/103 R |
| 5,950,190 | A | * | 9/1999 | Yeager et al. ................... 707/3 |
| 5,983,219 | A | | 11/1999 | Danish et al. ................... 707/5 |
| 6,014,639 | A | * | 1/2000 | Fohn et al. .................... 705/27 |
| 6,032,145 | A | | 2/2000 | Beall et al. ..................... 707/5 |
| 6,038,668 | A | * | 3/2000 | Chipman et al. ............ 713/201 |
| 6,086,617 | A | * | 7/2000 | Waldon et al. ................. 703/2 |
| 6,169,992 | B1 | * | 1/2001 | Beall et al. ............. 707/103 R |
| 6,272,488 | B1 | * | 8/2001 | Chang et al. ................... 707/4 |
| 6,275,821 | B1 | | 8/2001 | Danish et al. ................... 707/3 |
| 6,292,796 | B1 | * | 9/2001 | Drucker et al. ................ 707/5 |
| 6,324,534 | B1 | * | 11/2001 | Neal et al. ..................... 707/3 |
| 6,326,962 | B1 | * | 12/2001 | Szabo ......................... 345/762 |
| 6,327,588 | B1 | * | 12/2001 | Danish et al. ................... 707/3 |
| 6,460,037 | B1 | * | 10/2002 | Weiss et al. .................. 707/10 |
| 6,463,439 | B1 | * | 10/2002 | Dahlberg .................... 707/100 |
| 6,668,254 | B2 | * | 12/2003 | Matson et al. ................ 707/10 |
| 6,778,193 | B2 | * | 8/2004 | Biebesheimer et al. ..... 715/805 |
| 2002/0004793 | A1 | * | 1/2002 | Olan, Jr. ........................ 707/1 |

FOREIGN PATENT DOCUMENTS

| | | |
|---|---|---|
| WO | WO 96/12238 | 4/1996 |
| WO | WO 96/34350 | 10/1996 |
| WO | WO97/19415 | 5/1997 |
| WO | WO 99/53421 | 10/1999 |
| WO | WO 99/62018 | 12/1999 |

* cited by examiner

*Primary Examiner*—Greta Robinson  
*Assistant Examiner*—Miranda Le  
(74) *Attorney, Agent, or Firm*—Fish & Neave IP Group of Ropes & Gray LLP

(57) ABSTRACT

Systems and methods for parametrically searching databases. Database definitions may be provided by users. Interface definitions may be provided by users. Interfaces may be provided dynamically.

39 Claims, 48 Drawing Sheets

| NEW | EDIT | DELETE | NEW DATABASE |

| New Database | |
|---|---|
| Name: | |
| Description: | |
| Database Name: | |
| | Submit  Reset |

| NEW | EDIT | DELETE | NEW DATABASE |

| New Database | |
|---|---|
| Name: | customer 1 — 1401 |
| Description: | electronic component — 1402 |
| Database Name: | electronic component — 1403 |
| | Submit Reset |

| EDIT | DELETE | VALIDATE | REPORT | LIBRARY | METRICS | NEW GROUP |

| Database ||
|---|---|
| Name: | customer 1 |
| Description: | electronic components |
| Database Name: | electronic components |

1504
1501
+ Customer 1
1502
1505
1503

FIG. 15

| EDIT | DELETE | VALIDATE | REPORT | LIBRARY | METRICS | NEW GROUP |

1602

- Customer 1
  + electric
    components

1601

| Database | |
|---|---|
| Name: | customer 1 |
| Description: | electronic components |
| Database Name: | electronic components |

EDIT  DELETE  VALIDATE  REPORT  LIBRARY  METRICS  NEW GROUP

| New Group | |
|---|---|
| Name: | |
| Description: | |
| | Submit Reset |

- Customer 1
  + electric
    components 1701
1702

FIG. 17

| EDIT | DELETE | VALIDATE | REPORT | LIBRARY | METRICS | NEW GROUP |

- Customer 1
  + electric
     components

| New Group | |
|---|---|
| Name: | memory |  1801
| Description: | memory devices | 1802

[Submit] [Reset]
1803

| Edit Parameter | |
|---|---|
| Type: | Character ▼ |
| Professional Description: | Temperature Range |
| Laymen Description: | Temperature Range |
| Display Order: (36 Maximum)> | 4 |
| Visibility: | Searchable on initial screen ▼ |
| Presentation: | Check Box ▼ |
| Boolean Display: | Yes/No ▼ |
| Sort Order: | Ascending ▼ |
| Keywood Searchable: | No ▼ |
| Makes-Up Alternate: | No ▼ |
| Fuzzy Searchable: | Yes ▼ |
| Fuzzy Tolerance: | 100 |
| Allow Nulls: | Yes ▼ |
| Mask: | |
| Range (High): | |
| Range (Low): | |
| Allowed Values: | |
| Unit of Measure | |
| Style Guide: | ◄　　　► |
| | Submit  Reset |

2101 — Visibility
2102 — Presentation
2103 — Boolean Display

FIG. 21

| Microprocessors/Microcontrollers/Number Found: 7362 | | |
|---|---|---|
| | Units: <br> English ▼ | Currency: <br> Dollars ($) ▼ |

Status ─2201      ☐ Active    ☐ Discontinued    ☐ Limited

Temperature Range      ☐ Com    ☐ Ext    ☐ Mil

Low Voltage (3.3V or less)      ☐ YES

Category      ☐ Microcontrollers    ☐ Microprocessors

Ext. Data Bus (Bits)      ☐ 12   ☐ 128   ☐ 16   ☐ 32   ☐ 4   ☐ 64   ☐ 8   ☐ 8/16

Int. Data Bus (Bits)      ☐ 128 ☐ 16   ☐ 32 ☐ 4 ☐ 48   ☐ 60 ☐ 64   ☐ 8   ☐ 80   ☐ 9

Address Bus
```
---None Selected---
10
11
12
13
```

Direct Addressing Range
```
---None Selected---
1M
1.2M
1.5M
1.92K
```

[Search] [Reset]

FIG. 22

| Edit Parameter | |
|---|---|
| Type: | Character |
| Professional Description: | Temperature Range |
| Laymen Description: | Temperature Range |
| Display Order: (36 Maximum)> | 4 |
| Visibility: | Searchable on initial screen |
| Presentation: 2301 | List Box |
| Boolean Display: | Yes/No |
| Sort Order: | Ascending |
| Keywood Searchable: | No |
| Makes-Up Alternate: | No |
| Fuzzy Searchable: | Yes |
| Fuzzy Tolerance: | 100 |
| Allow Nulls: | Yes |
| Mask: | |
| Range (High): | 0 |
| Range (Low): | 0 |
| Allowed Values: | |
| Unit of Measure | |
| Style Guide: | |
| | Submit Reset 2302 |

FIG. 23

| | | |
|---|---|---|
| Microprocessors/Microcontrollers/Number Found: 7362 | | |
| | Units: English ▼ | Currency: Dollars ($) ▼ |

| | |
|---|---|
| Status | ☐ Active  ☐ Discontinued  ☐ Limited |
| 2401⟩<br>Temperature Range | ---None Selected---<br>Com<br>Ext<br>Ext/Com<br>Mil |
| Low Voltage (3.3V or less) | ☐ YES |
| Category | ☐ Microcontrollers  ☐ Microprocessors |
| Ext. Data Bus (Bits) | ☐12 ☐128 ☐16 ☐32 ☐4 ☐64 ☐8 ☐8/16 |
| Int. Data Bus (Bits) | ☐128 ☐16 ☐32 ☐4 ☐48 ☐60 ☐64 ☐8 ☐80 ☐9 |
| Address Bus | ---None Selected---<br>10<br>11<br>12<br>13 |
| Direct Addressing Range | ---None Selected---<br>1M<br>1.2M<br>1.5M<br>1.92K |

[Search] [Reset]

FIG. 24

| Edit Parameter | |
|---|---|
| Type: | Character ▼ |
| Professional Description: | Ext. Data Bus (Bits) |
| Laymen Description: | Ext. Data Bus (Bits) |
| Display Order: (36 Maximum)> | 10 |
| Visibility: | Searchable on initial screen ▼ |
| Presentation: | Check Box ▼ |
| Boolean Display: | Yes/No ▼ |
| Sort Order: | Ascending ▼ |
| Keywood Searchable: | No ▼ |
| Makes-Up Alternate: | No ▼ |
| Fuzzy Searchable: | Yes ▼ |
| Fuzzy Tolerance: | 100 |
| Allow Nulls: | Yes ▼ |
| Mask: | |
| Range (High): | |
| Range (Low): | |
| Allowed Values: | |
| Unit of Measure: | |
| Style Guide: | ◀ ▶ |
| | Submit Reset |

| Microprocessors/Microcontrollers/Number Found: 7362 | |
|---|---|
| | Units: [English ▼]   Currency: [Dollars ($) ▼] |
| Status | ☐ Active   ☐ Discontinued   ☐ Limited |
| Temperature Range | ☐ Com   ☐ Ext   ☐ Mil |
| Low Voltage (3.3V or less) | ☐ YES |
| Category | ☐ Microcontrollers   ☐ Microprocessors |
| Ext. Data Bus (Bits) ⟵2602 | ☐ 12  ☐ 128  ☐ 16  ☐ 32  ☐ 4  ☐ 64  ☐ 8  ☐ 8/16 |
| Int. Data Bus (Bits) | ☐ 128  ☐ 16  ☐ 32  ☐ 4  ☐ 48  ☐ 60  ☐ 64  ☐ 8  ☐ 80  ☐ 9 |
| Address Bus | ---None Selected---<br>10<br>11<br>12<br>13 |
| Direct Addressing Range | ---None Selected---<br>1M<br>1.2M<br>1.5M<br>1.92K |

[Search] [Reset]

FIG. 26

| Edit Parameter | |
|---|---|
| Type: | Character ▼ |
| Professional Description: | Ext. Data Bus (Bits) |
| Laymen Description: | Ext. Data Bus (Bits) |
| Display Order: (36 Maximum)> | 10 |
| Visibility: | Hidden ▼ |
| Presentation: | Check Box ▼ |
| Boolean Display: | Yes/No ▼ |
| Sort Order: | Ascending ▼ |
| Keywood Searchable: | No ▼ |
| Makes-Up Alternate: | No ▼ |
| Fuzzy Searchable: | Yes ▼ |
| Fuzzy Tolerance: | 100 |
| Allow Nulls: | Yes ▼ |
| Mask: | |
| Range (High): | |
| Range (Low): | |
| Allowed Values: | |
| Unit of Measure | |
| Style Guide: | |
| | Submit  Reset |

2701 (label pointing to Visibility row)
2702 (label pointing to Submit/Reset)

FIG. 27

| Microprocessors/Microcontrollers/Number Found: 7362 |  |
|---|---|
|  | Units: [English ▼]  Currency: [Dollars ($) ▼] |
| Status | ☐ Active  ☐ Discontinued  ☐ Limited |
| Temperature Range | ---None Selected---<br>Com<br>Ext<br>Ext/Com<br>Mil |
| Low Voltage (3.3V or less) | ☐ YES |
| Category | ☐ Microcontrollers  ☐ Microprocessors |
| Int. Data Bus (Bits) | ☐128 ☐16 ☐32 ☐4 ☐48 ☐60 ☐64 ☐8 ☐80 ☐9 |
| Address Bus | ---None Selected---<br>10<br>11<br>12<br>13 |
| Direct Addressing Range | ---None Selected---<br>1M<br>1.2M<br>1.5M<br>1.92K |
| [Search] [Reset] |  |

FIG. 28

| Find it 2904 | | | |
|---|---|---|---|
| CHIP SETS: 2901<br>- Chip sets<br><br>CUSTOM/ASIC: 2902<br>- Gate Array<br>- Linear/Digital Array<br>- Standard Cell<br><br>CONVERTERS:<br>- Analog-to-Digital<br>- Digital-to-Analog<br><br>DIGITAL:<br>- Bus Oriented Circuits<br>- Buffers<br>- Counters<br>- Delay Lines<br>- Flip Flops<br>- Gates<br>- Latches<br>- Other | DIGITAL SIGNAL<br>PROCESSORS:<br>- Digital Signal<br>Processors<br><br>DIODE:<br>- Avalanche/Suppressor<br>- Fast Recovery/High<br>Frequency<br>- General Purpose<br>- High Voltage<br>- Regulators<br>- Schottky/Switching<br><br>INTERFACE:<br>- Interface<br><br>LINEAR:<br>- Clocks/Synthesizers<br>- Comparators/Op Amps<br>- Consumer circuits<br>- Optoelectronics<br>- Power Control | LINEAR (Continued):<br>- Power Converters<br>- Special Purpose<br>Amplifiers<br>- Telecommunications<br>- Voltage Regulators<br>- Others<br><br>MEMORY:<br>- EPROMs<br>- EEPROMs<br>- Flash<br>- PROMs<br>- ROMs<br>- DRAM General<br>Purpose<br>- DRAM Module<br>- DRAM Other<br>- SRAM Module<br>- SRAM General<br>Purpose<br>- SRAM Other<br>- Other | MICROPROCESSORS/<br>MICROCONTROLLERS: 2903<br>- Microprocessors/<br>Microcontrollers<br>- System Components<br><br>OPTO ELECTRONICS:<br>- Laser Diodes<br>- Infrared<br>- Detectors<br>- Fiberoptics<br>- Couplers<br>- Displays<br>- LEDs<br><br>PLDs:<br>- CPLD<br>- FPGA<br>- GALs/PALs/etc.<br><br>TRANSISTORS:<br>- Bipolar<br>- FETs<br>- DIACs/TRIACs/SCRs/<br>etc. |

FIG. 29

MPS| Microprocessors/Microcontrollers

Number Found: 5610 — 3001

Refine search by selecting parameters below:

| | | |
|---|---|---|
| 3002 — | Status | ☑ Active |
| 3003 — | Temperature Range | ☐ Com  ☐ Ext  ☐ Mil |
| 3004 — | Low Voltage (3.3V or less) | ☐ YES |
| 3005 — | Category | ☐ Microcontrollers  ☐ Microprocessors |
| 3006 — | Ext. Data Bus (Bits) | ☐ 128  ☐ 16  ☐ 32  ☐ 4  ☐ 64  ☐ 8 |
| 3007 — | Int. Data Bus (Bits) | ☐ 128  ☐ 16  ☐ 32  ☐ 4  ☐ 48  ☐ 60  ☐ 64  ☐ 8  ☐ 80 |
| 3008 — | Address Bus | ---None Selected---<br>10<br>11<br>12<br>13 |
| 3009 — | Direct Addressing Range | ---None Selected---<br>1 M<br>1.2M<br>1.5K<br>1.92K |
| 3010 — | CPU Clock Range (MHz) | ☐ 1 to 4 Mhz  ☐ 41 to 65 Mhz  ☐ 5 to 10 Mhz  ☐ 200 plus Mhz<br>☐ 21 to 40 Mhz  ☐ 11 to 20 Mhz  ☐ 66 to 120 Mhz<br>☐ 121 to 200 Mhz |
| | | [Search] [Reset] |

FIG. 30

MPS | Microprocessors/Microcontrollers

Number Found: 5610

Refine search by selecting parameters below:

| | |
|---|---|
| Status | ☑ Active |
| Temperature Range | ☐ Com ☐ Ext ☑ Mil |
| Low Voltage (3.3V or less) | ☐ YES |
| Category | ☐ Microcontrollers ☑ Microprocessors |
| Ext. Data Bus (Bits) | ☐ 128 ☐ 16 ☐ 32 ☐ 4 ☐ 64 ☐ 8 |
| Int. Data Bus (Bits) | ☐ 128 ☐ 16 ☐ 32 ☐ 4 ☐ 48 ☐ 60 ☐ 64 ☐ 8 ☐ 80 |
| Address Bus | ---None Selected---<br>10<br>11<br>12<br>13 |
| Direct Addressing Range | ---None Selected---<br>1 M<br>1.2M<br>1.5K<br>1.92K |
| CPU Clock Range (MHz) | ☐ 1 to 4 Mhz ☐ 41 to 65 Mhz ☐ 5 to 10 Mhz ☐ 200 plus Mhz<br>☐ 21 to 40 Mhz ☐ 11 to 20 Mhz ☐ 66 to 120 Mhz<br>☐ 121 to 200 Mhz |

3101 — Status row
3102 — Category row
3103 — [Search] [Reset]

FIG. 31

MPS | Microprocessors/Microcontrollers

3201 — Number Found: 78
[View List of Devices] — 3225

Refine search by selecting parameters below:

| 3202 | Manufacturer | ---None Selected---<br>Advanced Micro<br>Aeroflex<br>Integrated Device<br>Intel |
|---|---|---|
| 3203 | Status | ☑ Active |
| 3204 | Temperature Range | ☑ Mil  ☐ Com  ☐ Ext |
| 3205 | Low Voltage (3.3V or less) | ☐ YES |
| 3206 | Packages | ☐ DIP  ☐ QCC  ☐ PGA  ☐ QFP  ☐ DMA |
| 3207 | Category | ☑ Microprocessors |
| 3208 | Ext. Data Bus (Bits) | ☐ 16  ☐ 32  ☐ 64  ☐ 8 |
| 3209 | Int. Data Bus (Bits) | ☐ 16  ☐ 32  ☐ 64  ☐ 8 |
| 3210 | Address Bus | ---None Selected---<br>16<br>18/38<br>20<br>24 |
| 3211 | Direct Addressing Range | ---None Selected---<br>128M<br>16M<br>1M<br>4G<br>64K |
| 3212 | Process Technology | ☐ CHMOS  ☐ CMOS  ☐ HMOS  ☐ NMOS  ☐ SCMOS  ☐ SOS |
| 3213 | Instruction Length | ---None Selected---<br>16<br>32<br>32/64<br>8/16 |
| 3214 | No. of Instructions | ---None Selected---<br>100<br>103<br>117<br>120 |

FIG. 32A

| | | |
|---|---|---|
| 3215 | RAM (On-Chip Memory) | ---None Selected---<br>16Kx8<br>2.5<br>2.5K<br>64x8 |
| 3216 | CACHE (On-Chip Memory) | ---None Selected---<br>16K(D)/16K<br>1K<br>2K(D)/2K(I<br>4K(D)/16K( |
| 3217 | Min CPU Clock (MHz) | ---None Selected---<br>0<br>10<br>100<br>12.5 |
| 3218 | Max CPU Clock (MHz) | ---None Selected---<br>10<br>100<br>12.5<br>120 |
| 3219 | Min Instruction Cycle (us) | ---None Selected---<br>0<br>0.03<br>0.035<br>0.04 |
| 3220 | Max Instruction Cycle (us) | ---None Selected---<br>0.04<br>0.05<br>0.06<br>0.1 |
| 3221 | Ext. Data Bus (Bits) | ☐ 10  ☐ 2  ☐ 3 |
| 3222 | Int. Data Bus (Bits) | ☐ 240  ☐ 248  ☐ 3  ☐ 4  ☐ 5  ☐ 6 |
| 3223 | I/O Lines | ---None Selected---<br>20<br>34 I/O, 8<br>36 I/O, 13<br>38 I/O, 10<br>8 |
| 3224 | Timer/Counter | ---None Selected---<br>2 32-bit<br>3 16-bit<br>8-bit |

[ Search ] [ Reset ]

FIG. 32B

MPS | Microprocessors/Microcontrollers

| Number Found: 78 |
|---|
| [View List of Devices] |

Refine search by selecting parameters below:

| | |
|---|---|
| Manufacturer | ---None Selected--- <br> Advanced Micro <br> Aeroflex <br> Integrated Device <br> Intel |
| Status | ☑ Active |
| Temperature Range | ☑ Mil ☐ Com ☐ Ext |
| Low Voltage (3.3V or less) | ☐ YES |
| Packages | ☐ DIP ☐ QCC ☐ PGA ☐ QFP ☐ DMA |
| Category | ☑ Microprocessors |
| Ext. Data Bus (Bits) | ☐ 16 ☑ 32 ☐ 64 ☐ 8 |
| Int. Data Bus (Bits) | ☐ 16 ☑ 32 ☐ 64 ☐ 8 |
| Address Bus | ---None Selected--- <br> 16 <br> 18/38 <br> 20 <br> 24 |
| Direct Addressing Range | ---None Selected--- <br> 128M <br> 16M <br> 1M <br> 4G <br> 64K |
| Process Technology | ☐ CHMOS ☑ CMOS ☐ HMOS ☐ NMOS ☐ SCMOS ☐ SOS |
| Instruction Length | ---None Selected--- <br> 16 <br> 32 <br> 32/64 <br> 8/16 |
| No. of Instructions | ---None Selected--- <br> 100 <br> 103 <br> 117 <br> 120 |

3301 — Ext. Data Bus (Bits)
3302 — Int. Data Bus (Bits)
3303 — Process Technology

FIG. 33A

| | |
|---|---|
| RAM (On-Chip Memory) | ---None Selected---<br>16Kx8<br>2.5<br>2.5K<br>64x8 |
| CACHE (On-Chip Memory) | ---None Selected---<br>16K(D)/16K<br>1K<br>2K(D)/2K(I<br>4K(D)/16K( |
| Min CPU Clock (MHz) | ---None Selected---<br>0<br>10<br>100<br>12.5 |
| Max CPU Clock (MHz) | ---None Selected---<br>10<br>100<br>12.5<br>120 |
| Min Instruction Cycle (us) | ---None Selected---<br>0<br>0.03<br>0.035<br>0.04 |
| Max Instruction Cycle (us) | ---None Selected---<br>0.04<br>0.05<br>0.06<br>0.1 |
| Int. Interrupts | ☐ 10    ☐ 2    ☐ 3 |
| Ext. Interrupts | ☐ 240   ☐ 248   ☐ 3   ☐ 4   ☐ 5   ☐ 6 |
| I/O Lines | ---None Selected---<br>20<br>34 I/O, 8<br>36 I/O, 13<br>38 I/O, 10<br>8 |
| Timer/Counter | ---None Selected---<br>2 32-bit<br>3 16-bit<br>8-bit |

3304 [ Search ] [ Reset ]

FIG. 33B

MPS | Microprocessors/Microcontrollers

3401 | Number Found: 21 |
| [View List of Devices] |

Refine search by selecting parameters below:

| | | |
|---|---|---|
| 3402 | Manufacturer | ---None Selected---<br>Advanced Micro<br>Integrated Device<br>Performance Semi<br>Space Elctrns |
| 3403 | Status | ☑ Active |
| 3404 | Temperature Range | ☑ Mil ☐ Com |
| 3405 | Low Voltage (3.3V or less) | ☐ YES |
| 3406 | Packages | ☐ QFP |
| 3407 | Category | ☑ Microprocessors |
| 3408 | Ext. Data Bus (Bits) | ☑ 32 |
| 3409 | Int. Data Bus (Bits) | ☑ 32 |
| 3410 | Address Bus | ---None Selected---<br>18/38<br>32 |
| 3411 | Direct Addressing Range | ---None Selected---<br>128M<br>4G |
| 3412 | Process Technology | ☑ CMOS |
| 3413 | Instruction Length | ---None Selected---<br>16<br>32<br>8/16<br>8/56 |
| 3414 | No. of Instructions | ---None Selected---<br>117<br>130<br>180 |
| 3415 | CACHE (On-Chip Memory) | ---None Selected---<br>4K(D)/16K(<br>512K<br>640 |

FIG. 34A

| | | |
|---|---|---|
| 3416 | Min CPU Clock (MHz) | ---None Selected---<br>0<br>10<br>100<br>12.5 |
| 3417 | Max CPU Clock (MHz) | ---None Selected---<br>16<br>20<br>25<br>28 |
| 3418 | Min Instruction Cycle (us) | ---None Selected---<br>0.03<br>0.035<br>0.04<br>0.05 |
| 3419 | Max Instruction Cycle (us) | ---None Selected---<br>0.12<br>0.125<br>0.15<br>0.2 |
| 3420 | Int. Interrupts | ☐ 2  ☐ 3 |
| 3421 | Ext. Interrupts | ☐ 4  ☐ 6 |
| 3422 | I/O Lines | ---None Selected---<br>36 I/O, 13<br>38 I/O, 10 |
| | 3423 [ Search ] [ Reset ] | |

FIG. 34B

MPS | Microprocessors/Microcontrollers

| Number Found: 21 |
|---|
| [View List of Devices] |

Refine search by selecting parameters below:

| | |
|---|---|
| Manufacturer | ---None Selected---<br>Advanced Micro<br>Integrated Device<br>Performance Semi<br>Space Elctrns |
| Status | ☑ Active |
| Temperature Range | ☑ Mil  ☐ Com |
| Low Voltage (3.3V or less) | ☐ YES |
| Packages | ☐ QFP |
| Category | ☑ Microprocessors |
| Ext. Data Bus (Bits) | ☑ 32 |
| Int. Data Bus (Bits) | ☑ 32 |
| Address Bus | ---None Selected---<br>18/38<br>32 |
| Direct Addressing Range | ---None Selected---<br>128M<br>4G |
| Process Technology | ☑ CMOS |
| Instruction Length | ---None Selected---<br>16<br>32<br>8/16<br>8/56 |
| No. of Instructions | ---None Selected---<br>117<br>130<br>180 |
| CACHE (On-Chip Memory) | ---None Selected---<br>4K(D)/16K(<br>512K<br>640 |

| | |
|---|---|
| Min CPU Clock (MHz) | ---None Selected---<br>0<br>16<br>20<br>25 |
| Max CPU Clock (MHz) | ---None Selected---<br>16<br>20<br>25<br>28 |
| Min Instruction Cycle (us) | ---None Selected---<br>0.03<br>0.035<br>0.04<br>0.05 |
| Max Instruction Cycle (us) | ---None Selected---<br>0.12<br>0.125<br>0.15<br>0.2 |
| Int. Interrupts | ☐ 2  ☐ 3 |
| Ext. Interrupts | ☐ 4  ☐ 6 |
| I/O Lines | ---None Selected---<br>36 I/O, 13<br>38 I/O, 10 |
| | 3502 [Search] [Reset] |

FIG. 35B

MPS | Microprocessors/Microcontrollers

| | |
|---|---|
| Number Found: 6 | |
| [View List of Devices] | |
| [Compare Results] | |

3601, 3622

Refine search by selecting parameters below:

| | |
|---|---|
| 3602 Manufacturer | ---None Selected---<br>Advanced Micro<br>Performance Semi |
| 3603 Status | ☑ Active |
| 3604 Temperature Range | ☑ Mil  ☐ Com |
| 3605 Low Voltage (3.3V or less) | ☐ YES |
| 3606 Category | ☑ Microprocessors |
| 3607 Ext. Data Bus (Bits) | ☑ 32 |
| 3608 Int. Data Bus (Bits) | ☑ 32 |
| 3609 Address Bus | ---None Selected---<br>18/38<br>32 |
| 3610 Direct Addressing Range | ---None Selected---<br>4G |
| 3611 Process Technology | ☑ CMOS |
| 3612 Instruction Length | ---None Selected---<br>32 |
| 3613 No. of Instructions | ---None Selected---<br>117 |
| 3614 CACHE (On-Chip Memory) | ---None Selected---<br>512k<br>640 |
| 3615 Min CPU Clock (MHz) | ---None Selected---<br>0<br>20<br>25<br>28<br>33 |

FIG. 36A

| | | |
|---|---|---|
| 3616 — Max CPU Clock (MHz) | ---None Selected---<br>16<br>20<br>25<br>28<br>33 | |
| 3617 — Min Instruction Cycle (us) | ---None Selected---<br>0.03<br>0.035<br>0.04<br>0.05<br>0.06 | |
| 3618 — Max Instruction Cycle (us) | ---None Selected---<br>0.12<br>0.15<br>0.2<br>0.25<br>1 | |
| 3619 — Int. Interrupts | ☐ 2 | |
| 3620 — Ext. Interrupts | ☐ 4  ☐ 6 | |
| | 3621 [ Search ] [ Reset ] | |

FIG. 36B

MPS | Microprocessors/Microcontrollers

| Number Found: 6 |
|---|
| [View List of Devices] |
| [Compare Results] |

Refine search by selecting parameters below:

| Manufacturer | ---None Selected---<br>Advanced Micro<br>Performance Semi |
|---|---|
| Status | ☑ Active |
| Temperature Range | ☑ Mil  ☐ Com |
| Low Voltage (3.3V or less) | ☐ YES |
| Category | ☑ Microprocessors |
| Ext. Data Bus (Bits) | ☑ 32 |
| Int. Data Bus (Bits) | ☑ 32 |
| Address Bus | ---None Selected---<br>18/38<br>32 |
| Direct Addressing Range | ---None Selected---<br>4G |
| Process Technology | ☑ CMOS |
| Instruction Length | ---None Selected---<br>32 |
| No. of Instructions | ---None Selected---<br>117 |
| CACHE (On-Chip Memory) | ---None Selected---<br>512k<br>640 |
| Min CPU Clock (MHz) | ---None Selected---<br>0<br>20<br>25<br>28<br>33 |

FIG. 37A

| | |
|---|---|
| Max CPU Clock (MHz) | ---None Selected---<br>16<br>20<br>25<br>28<br>33 |
| Min Instruction Cycle (us) | ---None Selected---<br>0.03<br>0.035<br>0.04<br>0.05<br>0.06 |
| Max Instruction Cycle (us) | ---None Selected---<br>0.12<br>0.15<br>0.2<br>0.25<br>1 |
| Int. Interrupts | ☐ 2 |
| Ext. Interrupts | ☑ 4   ☐ 6 |

[ Search ]  [ Reset ]

FIG. 37B

MPS | Microprocessors/Microcontrollers

| | |
|---|---|
| 3801 | Number Found: 2 |
| 3802 | [View List of Devices] |
| 3803 | [Compare Results] |

Refine search by selecting parameters below:

| | |
|---|---|
| Manufacturer | ---None Selected---<br>Advanced Micro |
| Status | ☑ Active |
| Temperature Range | ☑ Mil |
| Category | ☑ Microprocessors |
| Ext. Data Bus (Bits) | ☑ 32 |
| Int. Data Bus (Bits) | ☑ 32 |
| Address Bus | ---None Selected---<br>32 |
| Direct Addressing Range | ---None Selected---<br>4G |
| Process Technology | ☑ CMOS |
| Instruction Length | ---None Selected---<br>32 |
| No. of Instructions | ---None Selected---<br>117 |
| CACHE (On-Chip Memory) | ---None Selected---<br>117 |
| Min CPU Clock (MHz) | ---None Selected---<br>0 |
| Max CPU Clock (MHz) | ---None Selected---<br>16<br>20 |
| Min Instruction Cycle (us) | ---None Selected---<br>0.05<br>0.06 |
| Instruction Length | ---None Selected---<br>1 |
| Ext. Interrupts | ☑ 4 |
| | [ Search ]  [ Reset ] |

FIG. 38

MPS | Microprocessors/Microcontrollers
　　　⌐3901

| Compare | Manufacturer (click for contact info) | Part Number (click to view part detail)⌐3902 |
|---------|---------------------------------------|-----------------------------------------------|
| ☐ | Advanced Micro | AM29000-16B |
| ☐ | Advanced Micro | AM29000-16B |

[Search] [Reset]

FIG. 39

Advanced Micro Devices, Inc.

One AMD Place, PO Box 3453
Sunnyvale, California 94088-3453
408-732-2400

Website: www.amd.com
E-mail: hw.support@amd.com

| sales offices | distributors |

FIG. 40

MPS | Microprocessors/Microcontrollers

| Part Number | AM29000-20B (4101) | AM29000-16B (4102) |
|---|---|---|
| Select Related Part Data | Select Related Data ▼ | Select Related Data ▼ |
| Max CPU Clock (MHz) | 20 | 16 |
| Min Instruction Cycle (us) | 0.05 | 0.06 |
| Comments | 3 Add. Buses, ALU, MMU | 3 Add. Buses, ALU, MNU |
| Manufacturer | Advanced Micro | |
| Status | Active | |
| Temperature Range | Mil | |
| Low Voltage (3.3V or less) | - | |
| Packages | - | |
| Category | Microprocessors | |
| Ext. Data Bus (Bits) | 32 | |
| Int. Data Bus (Bits) | 32 | |
| Address Bus | 32 | |
| Direct Addressing Range | 4G | |
| Process Technology | CMOS | |
| Instruction Length | 32 | |
| No. of Instructions | 117 | |
| RAM (On-Chip Memory) | - | |
| ROM (On-Chip Memory) | - | |
| EPROM (On-Chip Memory) | - | |
| CACHE (On-Chip Memory) | 640 | |
| Min CPU Clock (MHz) | 0 | |
| Max Instruction Cycle (us) | 1 | |
| Int. Interrupts | - | |
| Ext. Interrupts | 4 | |
| I/O Lines | - | |
| Timer/Counter | - | |
| A/D Converter | - | |
| D/A Converter | - | |

FIG. 41

SYSTEMS AND METHODS FOR PERFORMING PARAMETRIC SEARCHES

FIELD OF THE INVENTION

The present invention relates to systems and methods for performing parametric searches of electronic databases. More particularly, this invention relates to systems and methods for providing parametric search engines that search user-specified electronic databases and that have user interfaces that can be configured dynamically.

BACKGROUND OF THE INVENTION

A parametric search is a search technique that identifies a desired product by using attributes, commonly referred to as "parameters," of that product. Parameters are supplied by end-users to define the searches. An end-user is a person who performs a parametric search to identify a desired product. Each parameter that is supplied by the end-user potentially narrows the number of products that satisfy the search. Generally, end-users provide search parameters, examine the search results for those parameters, and provide additional parameters to narrow the search. As a result, parametric searches are iterative searches in which an end-user progressively adds more and more parameters to the search until finding the desired product or products.

Because of this iterative process, parametric searches are well suited for computer applications. In fact, parametric search engines are currently being used for searching electronic catalogs on the Internet. An electronic catalog is a series of data records that have been logically grouped into various categories. A parametric search engine searches through the hierarchy and structure of the data records within the electronic databases to find products having the specified parameters.

One approach for designing parametric search engines is to tailor the parametric search engine for the structure and hierarchy of a specific electronic database (i.e. for a particular data record definition). This approach, however, is undesirable because a new parametric search engine must be created, or an existing parametric search engine must be modified, for different electronic databases. Furthermore, if the hierarchy or structure of the data records within the electronic database is modified, the parametric search engine must be modified as well. Such an approach is inefficient in terms of both time and resources.

Another approach for designing parametric search engines is to create a parametric search engine that searches a specific database format, such as Microsoft's SQL Server or Oracle's 8i database. This approach allows the parametric search engine to be used for multiple applications, as long as those applications use the specified database format. After the electronic database has been properly formatted, parametric search engines of this type import the electronic database. If the structure or hierarchy of the data within the electronic database is later changed or modified, parametric search engines of this type must then re-import the modified database before performing a parametric search on the modified database.

Thus, it would be desirable to have systems and methods for providing parametric search engines that dynamically search electronic databases without re-importing the database or converting the database to a standard format and that have interfaces that can be configured dynamically.

SUMMARY OF THE INVENTION

The present invention provides systems and methods for dynamically performing parametric searches of electronic databases. In some embodiments, searches of user-specified electronic databases may be dynamically performed for different or updated databases without re-importing the database or converting the database to a standard format. In some embodiments, user interfaces are provided to users dynamically to provide interface features appropriate to the current database. In some embodiments, a parametric search may be performed on a user-specified electronic database in which the user interfaces are provided to the users dynamically.

A computer application may be provided within a parametric search engine that prompts a user to describe the hierarchy of the data records within the electronic database. With this information, the computer application creates a mapping function between the data records within the electronic database and the parametric search engine. This mapping function describes the hierarchy of the data records to the parametric search engine which enables the parametric search engine to locate and process the data records as required.

By specifying in a file ("specification file"), for example, the structure or hierarchy of the data records within the electronic database instead of importing the entire database, parametric searches could then be performed on modified databases by simply updating the specification file. After a database has been modified, a parametric search engine could execute an application which prompts a user to specify the new structure or hierarchy of the database and then updates the specification file. A user is a person who maintains the electronic database and modifies the parametric search engine, when required. In this way, parametric search engines could dynamically search modified electronic databases without re-importing the database.

Furthermore, parametric search engines have user interfaces that also may need to be modified without having to re-import the entire database. The user interface is an integral part of any parametric search engine. The user interface allows the end-user to select the parameters for the search as well as view the results of that search. The format of the user interface is a function of the data and the hierarchy of that data within the electronic database. Although the data within an electronic database may not change, it is often advantageous to modify how that data is presented to the end-user. Existing parametric search engines, however, alter existing user interfaces by first modifying the electronic database and then re-importing the entire database into the parametric search engine. Consequently, this type of modification to the user interface could not occur dynamically. A better and more efficient approach would allow the parametric search engine to configure or tailor the user interface dynamically.

Some embodiments of the present invention may prompt the user to specify the format of each computer screen that is presented to the end-user during each iteration of the parametric search. For example, some embodiments of the present invention may provide a limited number of parameters to the end-user during each iteration of the parametric search. These parameters may be selected by the user. The user may be prompted to describe the format in which these parameters may be displayed to an end-user. For example, the user may be prompted to specify the display options for the parameters, such as the order in which the parameters are listed and how the parameters are presented. Users may select between various display elements, such as list boxes, check boxes, boolean fields (e.g., Yes/NO, On/Off), any other suitable display option, or any suitable combination of display options.

The display options may be stored in a data definition file that is used by the parametric search engine. If the user decides to alter the user interface at a later time, some embodiments of the present invention may re-execute the computer application to allow the user to make whatever changes are required. The computer application then updates the data definition file in view of the changes made by the user.

BRIEF DESCRIPTION OF THE DRAWINGS

Further features of the present invention, its nature and various advantages will be more apparent from the following detailed description, taken in conjunction with the accompanying drawings, in which like reference characters refer to like parts throughout, and in which:

FIGS. 13 and 14 are illustrative displays for allowing users to specify electronic databases in accordance with one embodiment of the present invention.

FIGS. 15 and 16 are illustrative displays for allowing users to view the hierarchical structure of an electronic database in accordance with one embodiment of the present invention.

FIGS. 17 and 18 are illustrative displays for allowing users to specify sub-groups within an electronic database in accordance with one embodiment of the present invention.

FIGS. 19 and 20 are illustrative displays for allowing users to view the hierarchical structure of sub-groups within an electronic database in accordance with one embodiment of the present invention.

FIG. 21 is an illustrative display for allowing users to edit the user interface of a parametric search engine in accordance with one embodiment of the present invention.

FIG. 22 is an illustrative display for allowing end-users to provide search parameters during a parametric search in accordance with one embodiment of the present invention.

FIG. 23 is an illustrative display for allowing users to edit the user interface of a parametric search engine in accordance with one embodiment of the present invention.

FIG. 24 is an illustrative display for allowing end-users to provide search parameters during a parametric search in accordance with one embodiment of the present invention.

FIG. 25 is an illustrative display for allowing users to edit the user interface of a parametric search engine in accordance with one embodiment of the present invention.

FIG. 26 is an illustrative display for allowing end-users to provide search parameters during a parametric search in accordance with one embodiment of the present invention.

FIG. 27 is an illustrative display for allowing users to edit the user interface of a parametric search engine in accordance with one embodiment of the present invention.

FIG. 28 is an illustrative display for allowing end-users to provide search parameters during a parametric search in accordance with one embodiment of the present invention.

FIG. 29 is an illustrative display for allowing end-users to initiate a parametric search in accordance with one embodiment of the present invention.

FIGS. 30 and 31 are illustrative displays for allowing end-users to select initial parameters for a parametric search in accordance with one embodiment of the present invention.

FIGS. 32A, 32B, 33A and 33B are illustrative displays for allowing end-users to select parameters for a second iteration of a parametric search in accordance with one embodiment of the present invention.

FIGS. 34A, 34B, 35A and 35B are illustrative displays for allowing end-users to select parameters for a third iteration of a parametric search in accordance with one embodiment of the present invention.

FIGS. 36A, 36B, 37A and 37B are illustrative displays for allowing end-users to select parameters for a fourth iteration of a parametric search in accordance with one embodiment of the present invention.

FIG. 38 is an illustrative display for allowing end-users to select parameters for a fifth iteration of a parametric search in accordance with one embodiment of the present invention.

FIG. 39 is an illustrative display for allowing end-users to view the results of a parametric search in accordance with one embodiment of the present invention.

FIG. 40 is an illustrative display for allowing end-users to view detailed information regarding a product manufacturer that was identified by a parametric search in accordance with one embodiment of the present invention.

FIG. 41 is an illustrative display for allowing end-users to compare the results of a parametric search in accordance with one embodiment of the present invention.

DETAILED DESCRIPTION

Figure 1:
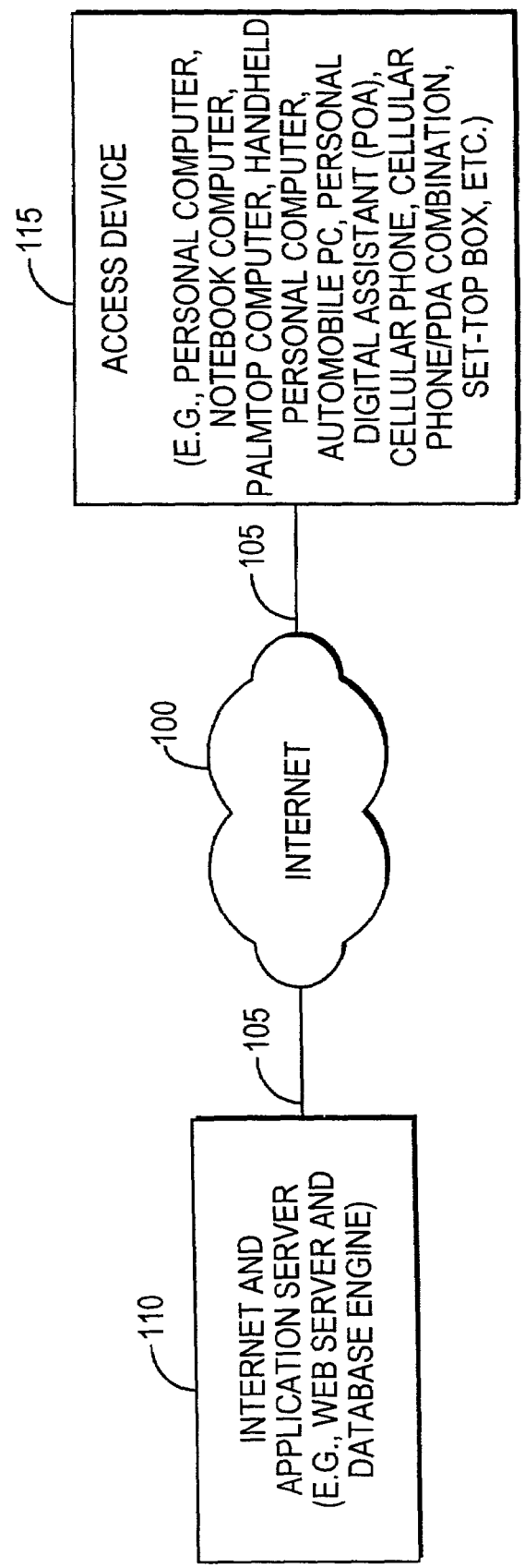
FIG. 1 is a diagram of an illustrative Internet-based system in accordance with one embodiment of the present invention.
Figure 2:
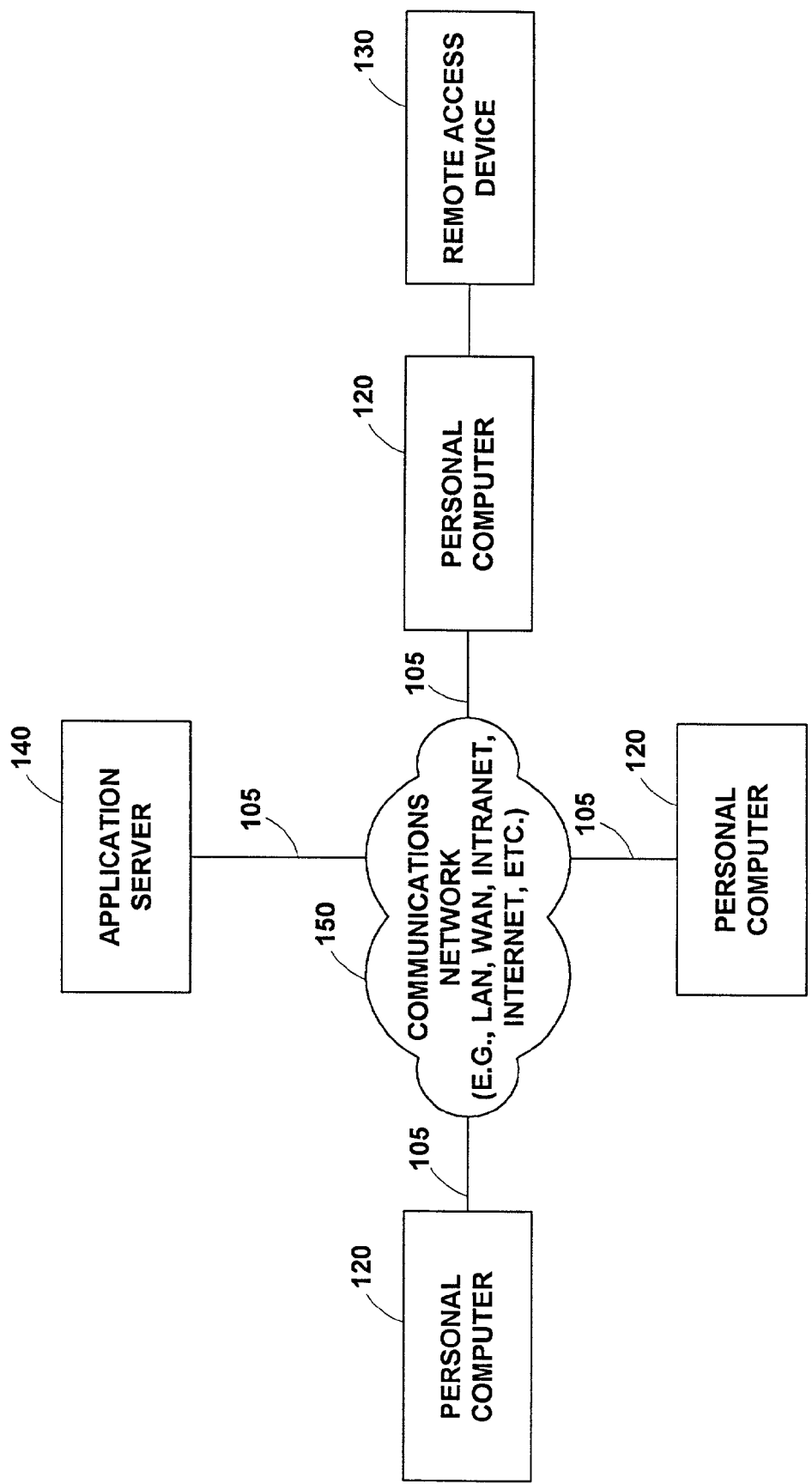
FIG. 2 is a diagram of an illustrative non-Internet client/server-based system in accordance with one embodiment of the present invention.

The parametric search systems and methods of some embodiment of the present invention may be implemented using any suitable communications network. For example, any suitable non-Internet-based client/server or peer-to-peer approach or, preferably, any suitable Internet-based approach, may be used. If desired, a combination of these approaches may be used. Illustrative Internet-based and non-Internet-based arrangements are shown in FIGS. 1 and 2, respectively. In the illustrative Internet-based arrangement of FIG. 1, access devices 115 may be connected via links 105 to Internet 100. Access devices 115 may include any device or combination of devices suitable for providing Internet access to either a user or an end-user of the systems and methods of the present invention. Access devices may include, for example, any suitable personal computer (PC), portable computer (e.g., a notebook computer), palmtop computer, handheld personal computer (H/PC), automobile PC, personal digital assistant (PDA), Internet-enabled cellular phone, combined cellular phone and PDA, ebook, set-top box (e.g., a Web TV enabled set-top box), or other device suitable for providing Internet access.

Internet and application server 110 may be any server suitable for providing on-line access to a parametric search web site. Internet and application server 110 may, for example, provide one or more pages to access devices 115 using one or more suitable protocols (e.g., the HyperText Transfer Protocol (HTTP) and Transmission Control Protocol/Internet Protocol (TCP/IP)). The pages may be defined using, for example, any suitable markup language (e.g., HyperText Markup Language (HTML), Dynamic HyperText Markup Language (DHTML), etc.), and include pages defined using the Extensible Markup Language (XML), JavaServer Pages (JSP), Active Server Pages (ASP), or any other suitable approaches. The pages may include scripts, computer code, or subsets of computer code, that define mini-programs (e.g., Perl scripts, Java applets, Enterprise JavaBeans (EJB) or any other suitable approach). The system may be designed using suitable approaches, such as Java 2 Platform—Enterprise Edition (J2EE), Component Object Model (COM), Distributed Component Object Model (DCOM), or any other suitable approach.

Internet and application server 110 may run a database engine suitable for maintaining electronic databases such as, for example, Microsoft SQL Server, Oracle 8*i*, or any other suitable database engine. Internet and application server 110 may maintain product catalogue databases, such as databases for integrated circuits, automobile parts, pharmaceutical products, construction materials, or any other suitable product or combination of products.

In practice, functionalities of Internet and application server 110 may be integrated into a single server, or may be distributed across multiple servers that are interconnected via Internet 100. In addition, different product catalogue databases may be maintained on multiple servers that are interconnected via communications network 150. For example, a user may maintain a product catalogue locally on a database engine that is connected to communications network 150. Internet and application server 110 may then transmit the appropriate commands over communications network 150 to the user's database engine in order to perform the parametric search.

Links 105 may include any transmission medium suitable for providing Internet access to access devices 115. Links 105 may include, for example, a dial-up telephone line, a computer network or Internet link, an infrared link, a radio frequency link, a satellite link, a digital subscriber line link (e.g., a DSL link), a cable TV link, a DOCSIS link, or any other suitable transmission link or suitable combination of such links. Different links 105 may be of different types depending on, for example, the particular type of access device 115.

Any protocol or protocol stack suitable for supporting communications between access devices 115 and Internet and application server 110 over links 105 based on the particular access device 115 and link 105 may be used. For example, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), wireless application protocol (WAP), serial line Internet protocol (SLIP), point to point protocol (PPP), Transmission Control Protocol/Internet Protocol (TCP/IP), Sequenced Packet Exchange and Internetwork Packet Exchange (SPX/FPX) protocols, or any other suitable protocol or combination of protocols may be used.

FIG. 2 shows another illustrative arrangement for a system in accordance with one embodiment of the present invention. In the non-Internet-based client/server arrangement of FIG. 2, personal computers 120 (sometimes also referred to herein as access devices) are interconnected via communications network 150 to application server 140. Application server 140 may be any server suitable for allowing users to perform parametric searches. Application server 140 may run a suitable database engine such as, for example, Microsoft SQL Server, Oracle 8*i*, or any other suitable database engine. Application server 140 may, for example, maintain product catalogue databases such as databases for integrated circuits, automobile parts, pharmaceutical products, construction materials, or any other suitable product or combination of products. In practice, the functionalities of application server 140 may be integrated into a single server, or may be distributed across multiple servers that are interconnected via communications network 150. In addition, different product catalogue databases may be maintained on multiple servers that are interconnected via communications network 150. For example, a user may maintain a product catalogue locally on personal computer 120. Application server 140 may transmit the appropriate commands to the user's personal computer 120 in order to perform the parametric search.

Communications network 150 may be any suitable local area network (LAN), wide area network (WAN), or other suitable network. Personal computers, and their interconnection via networks, are well known. Personal computers 120 may run suitable e-mail, HTTP, or other clients and client applications for providing users with access to the features of the system. In still another suitable approach, personal computers 120 may run suitable Internet browsers to provide users with access to the Internet via an Internet server (not shown). If desired, one or more personal computers 120 may be accessed by remote access device 130 to provide remote access to users to the system and method of the present invention. Remote access device 130 may be any suitable device, such as a personal computer, personal digital assistant, cellular phone, or other device with remote access capabilities.

Figure 3:
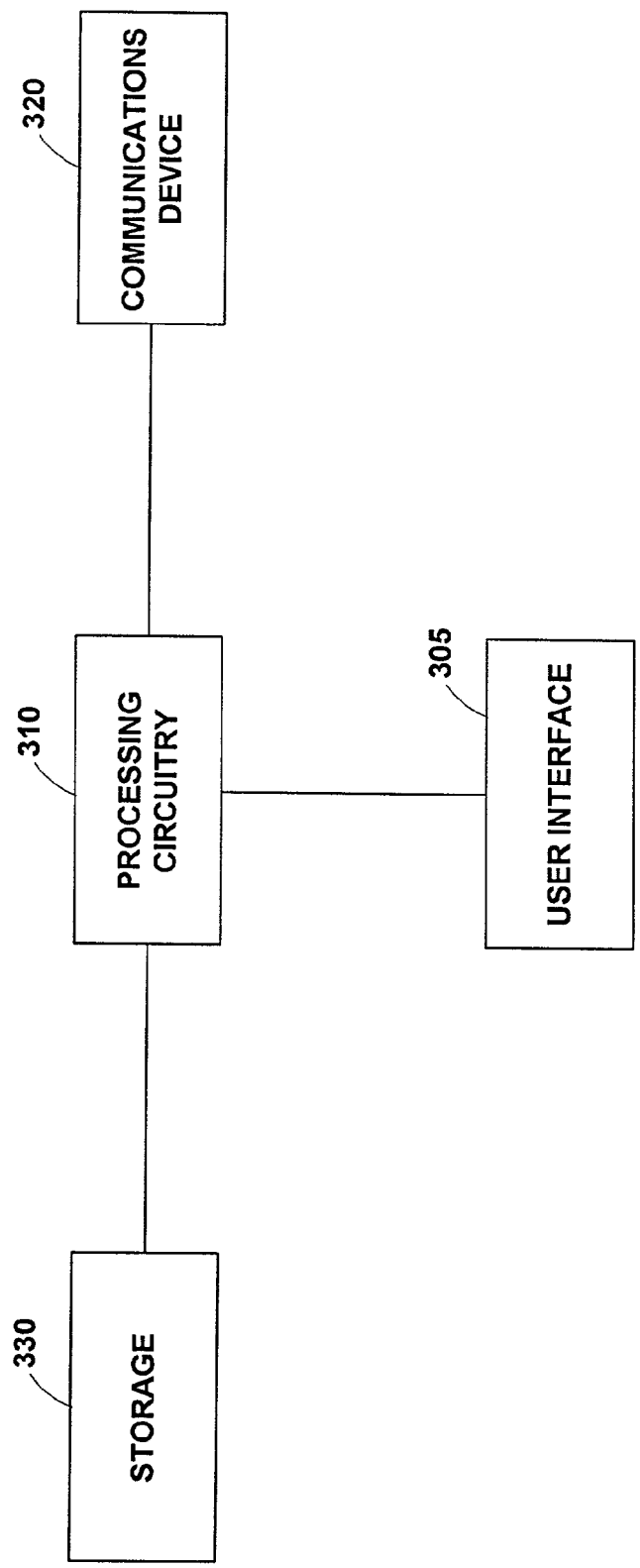
FIG. 3 shows a generalized arrangement for the access device of FIG. 1 in accordance with one embodiment of the present invention.

FIG. 3 shows an illustrative, generalized arrangement for access device 115 of FIG. 1. Access device 115 may have, for example, processing circuitry 310, storage 330, user interface 305, and communications device 320. Processing circuitry 310 may include any suitable processor, such as, for example, an Intel Pentium® microprocessor, and other circuitry (e.g., input/output circuitry, direct memory access (DMA) circuitry, etc.). Storage 330 may be any suitable memory, storage device, or combination thereof, such as CD-ROM, RAM, ROM, flash memory, a hard-disk drive, etc. User interface 305 may be any suitable input device, output device, or combination thereof, and may include, for example, a pointing device, keyboard, touch-pad, touch screen, pen stylus, voice recognition system, mouse, track-ball, cathode ray tube (CRT) monitor, liquid crystal display (LCD), voice synthesis processor and speaker, tactile feedback device, remote scent dispenser or any other suitable user input or output device.

Communications device 320 may be any device suitable for supporting communications over links 105. Communications device 320 may include, for example, a modem (e.g., any suitable analog or digital standard, cable, or cellular modem), network interface card (e.g., an Ethernet card, token ring card, etc.), wireless transceiver (e.g., an infrared, radio, or other suitable analog or digital transceiver), or other suitable communications device.

Figure 4:
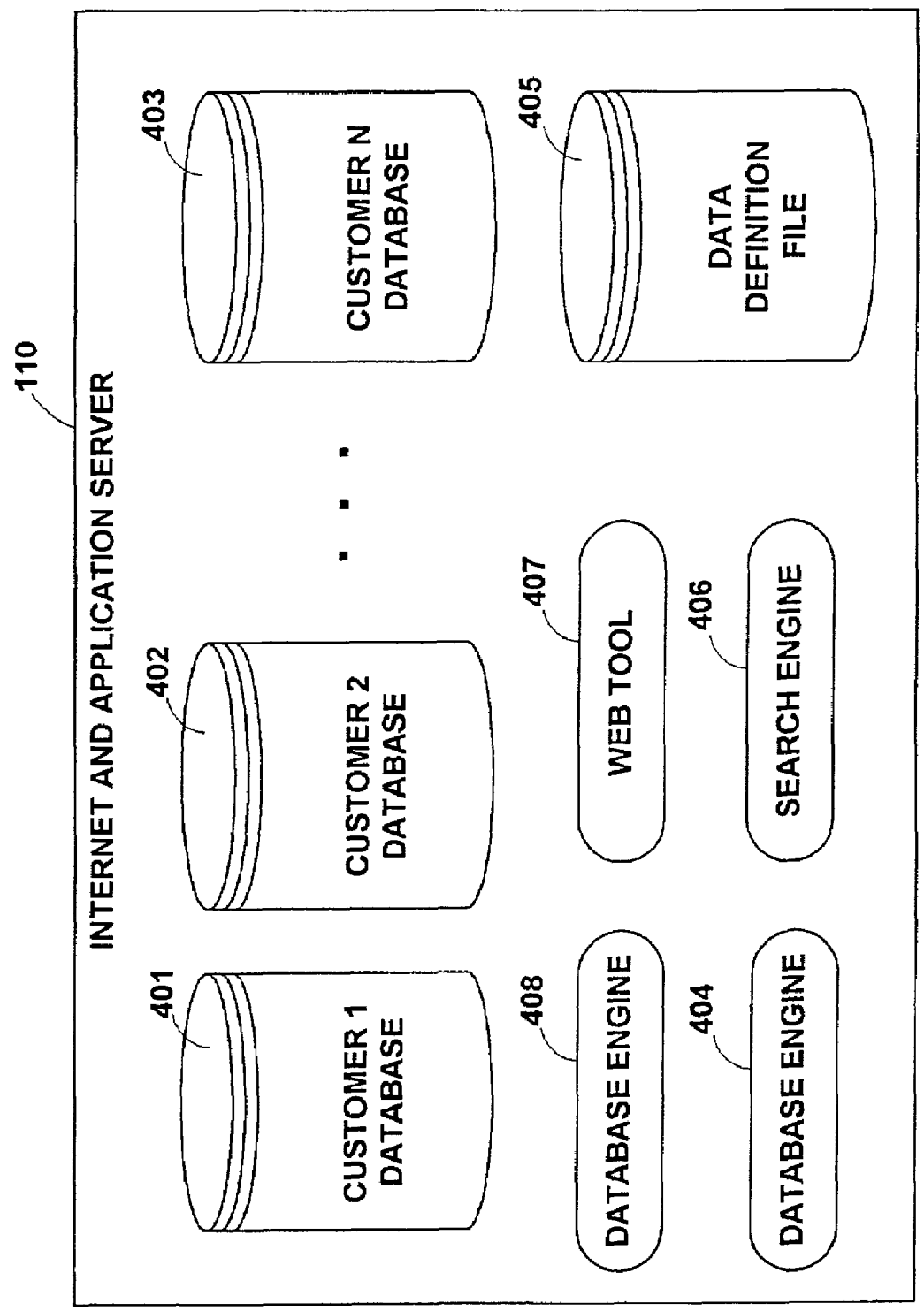
FIG. 4 shows a generalized arrangement for the Internet and application server of FIG. 1 in accordance with one embodiment of the present invention.

FIG. 4 shows an illustrative, generalized arrangement for Internet and application server 110 of FIG. 1. Internet and application server 110 may have, for example, customer 1 database 401, customer 2 database 402, customer N database 403, database engine 404, database engine 408, data definition file 405, search engine 406 and web tool 407. Customer 1 database 401, customer 2 database 402 and customer N database 403 may be any collection of data records that is organized such that the contents of the data records can easily be accessed, managed, and updated, such as, for example, IBM's DB2 database, Microsoft's Access database, databases from Oracle, Sybase or Computer Associates, or any other suitable database. Database engines 404 and 408 may be any computer program that allows one or more computer users to create and access data records in an electronic database, such as, for example, Microsoft SQL Server, Oracle 8i server, or any other suitable database engine.

As shown in FIG. 4, Internet and application server 110 may maintain multiple customer databases 401, 402 and 403 and multiple database engines 404 and 408. Customer databases and database engines may also be maintained on systems and servers other than Internet and application server 110. Customers may maintain their databases locally on their own systems, remotely on Internet and application server 110 or may have a third party maintain the customer's database on that party's system. When the customer's database is stored either locally on the customer's own system or stored remotely on a third party's system, the customer's database may be connected to Internet and application server 100 by either Internet 100 or by communications network 150. Customers may also maintain a database server for their databases locally on their own systems, remotely on Internet and application server 110 or remotely on a third party's computer system 760. When the customer's database engine is stored either locally on the customer's own system or stored remotely on a third party's computer system, the customer's database engine may be connected to Internet and application server 110 by Internet 100 or by communications network 150.

Figure 5:
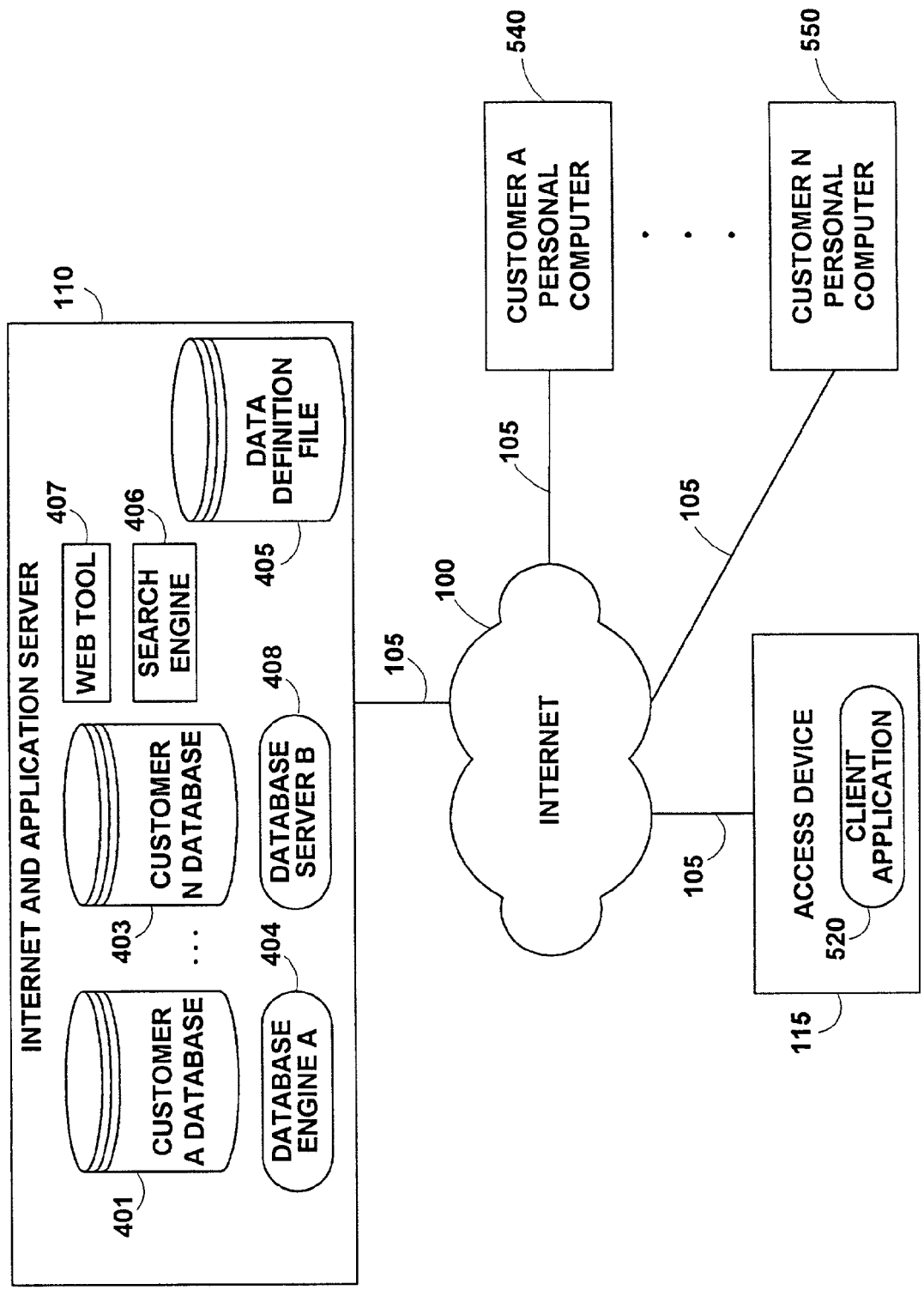
FIG. 5 is an illustrative diagram in accordance with one embodiment of the present invention in which electronic databases are stored by the Internet and application server of FIG. 1.
Figure 6:
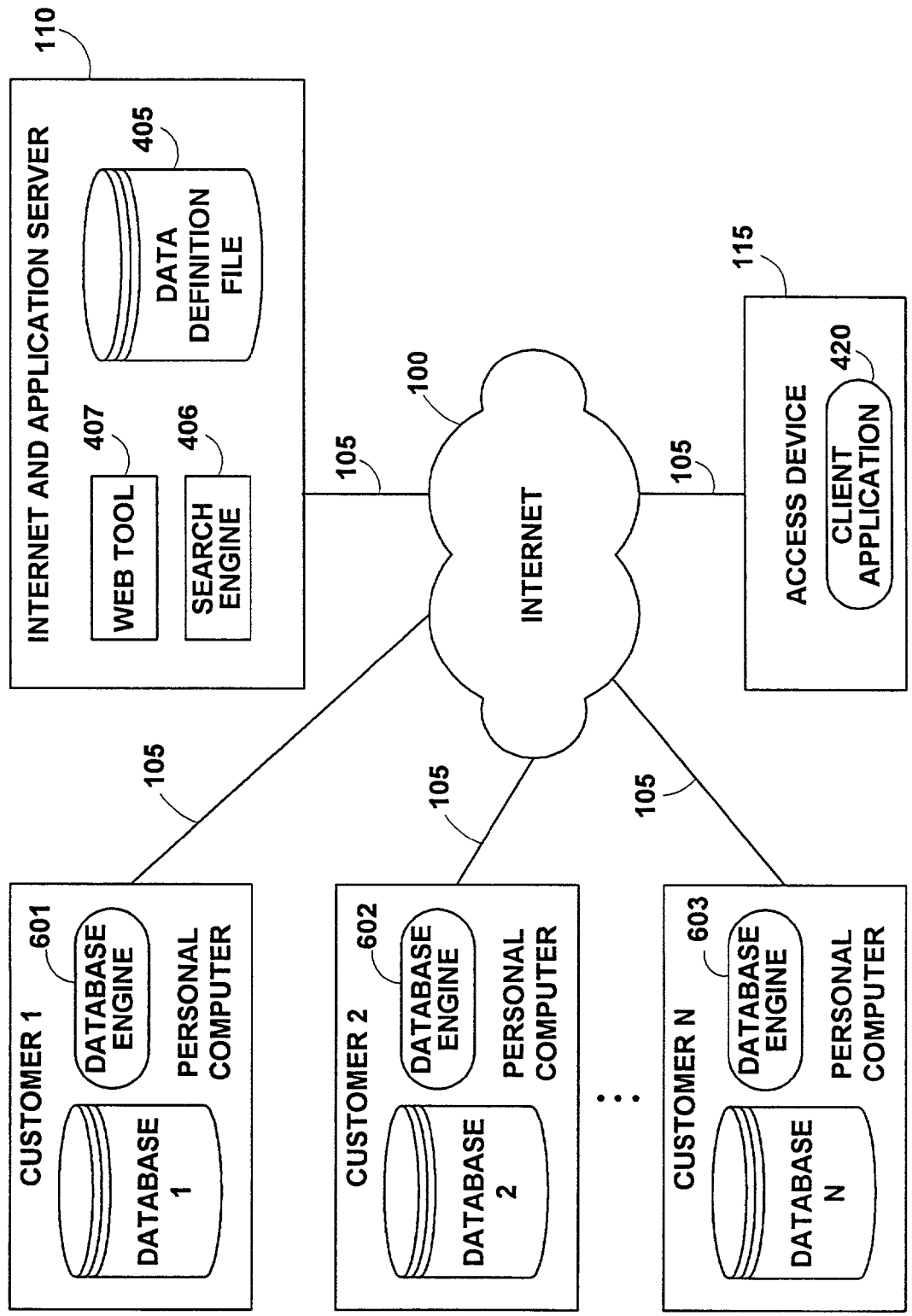
FIG. 6 is an illustrative diagram in accordance with one embodiment of the present invention in which electronic databases are stored locally on each customer's computer system.
Figure 7:
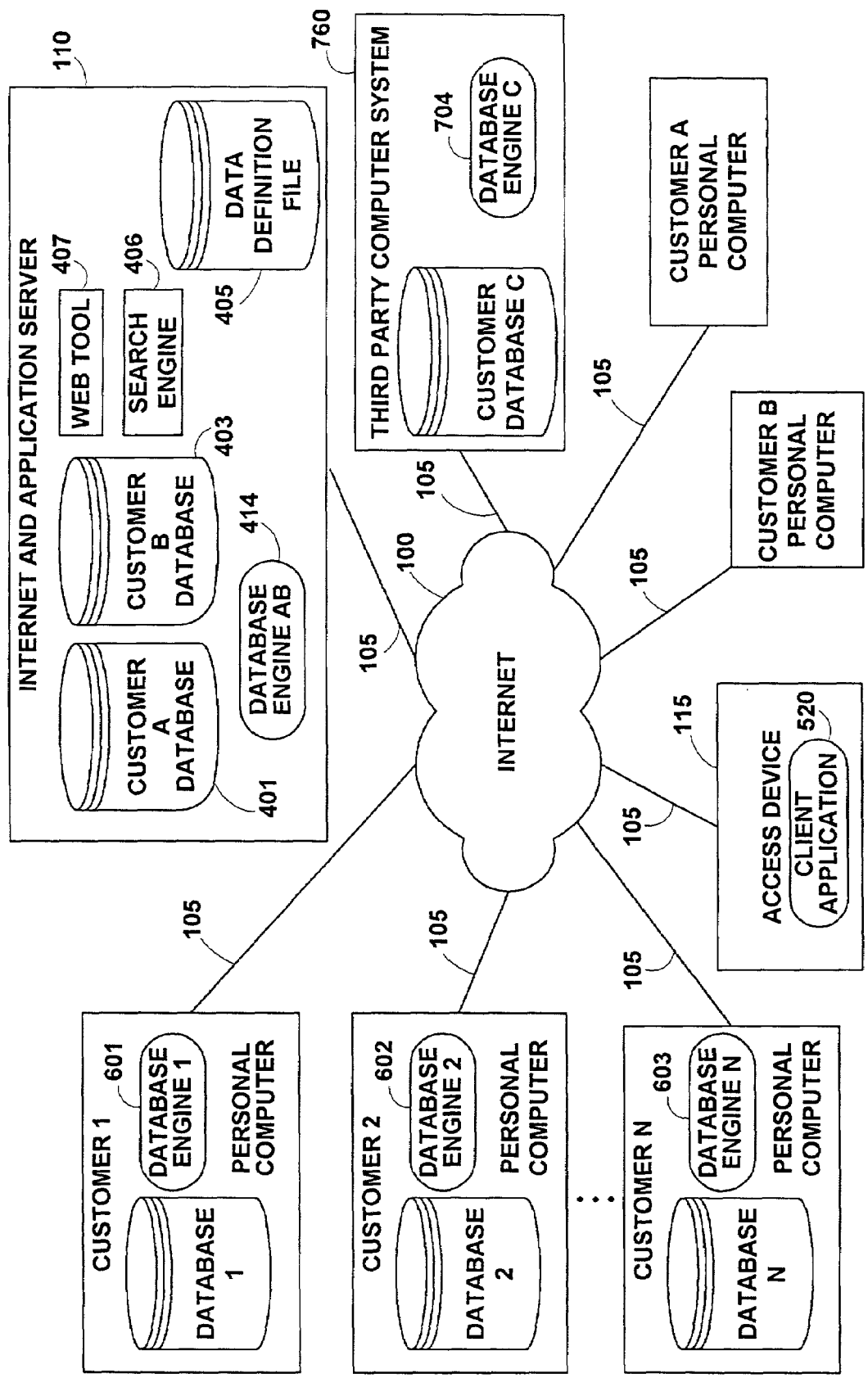
FIG. 7 is an illustrative diagram in accordance with one embodiment of the present invention in which electronic databases are stored by the Internet and application server of FIG. 1, are stored locally on some customers' computer systems and are stored on a third party's computer system.

FIGS. 5, 6 and 7 are illustrative system architectures for supporting multiple databases in accordance with three embodiments of the present invention. FIG. 5 shows an illustrative system architecture for Internet and application server 110 in accordance with one embodiment of the present invention. In the example of FIG. 5, Internet and application server 110 maintains local copies of database engines 404 and 408 and a local copy of each customer's database 401 and 403. Database engines 404 and 408 may allow end-users to access customer A's and customer B's databases, respectively, in accordance with one embodiment of the present invention. In another embodiment of the present invention, database engine 404, for example, may allow end-users to access both customer A's and customer B's database.

FIG. 6 shows another illustrative system architecture for supporting multiple databases in accordance with one embodiment of the present invention. In FIG. 6, customers 1 through N maintain a local copy of both a database engine and their database on a personal computer. In this embodiment, the parametric search engine makes remote calls to the database engines that reside at each customer's site. FIG. 7 shows another illustrative system architecture in which some databases (i.e. Customer A's and Customer B's databases) are stored on Internet and application server 110, some databases (i.e. Customer 1's through Customer N's databases) are stored on the customer's personal computer and some databases (i.e. Customer C's database) are stored on a third party computer system 760. In this embodiment, database engine 414 may allow end users to access either customer A's or customer B's databases. Also, in this embodiment, when executing a parametric search, parametric search engine 406 may make remote calls to the database engines 601, 602, 603 and 704 that reside at each customer's site and that reside on the third party's computer system, respectively.

FIGS. 8–12B are flowcharts of steps for performing dynamic parametric searches in accordance with one embodiment of the present invention. Some of the steps shown in FIGS. 8, 9, 10, 11, 12A and 12B involve providing either a user or an end-user with opportunities to interact with the system, performing various processes, or providing various displays. These and other steps may be performed by, for example, a client application that is programmed to generate or download screens suitable to provide such opportunities, an Internet browser that downloads suitable "web" pages to provide such opportunities, or using any other suitable approach. Other steps may involve additional processing, such as searching or other types of processing. In non-on-line arrangements, such processing may be performed by the client, a server, or distributed among peer applications, depending on the chosen system implementation and the processing requirements of such operations. In on-line arrangements, such processing may be performed by access device 115 or Internet and application server 110, depending on, for example, the processing and storage capabilities of access device 115, the chosen implementation for the markup language documents used, the processing requirements of such operations, or other factors. For purpose of clarity, the following discussion will describe the steps shown in FIGS. 8, 9, 10, 11, 12A and 12B as being performed by "the system," which is intended to include any suitable parametric search system, such as, for example, any non-on-line or on-line arrangement suitable for performing the steps.

The steps shown in FIGS. 8–12B are illustrative and may be combined or performed in any suitable order. By way of illustration, and not for purposes of limitation, this embodiment of the present invention will be described as applied to an electronic database that contains an integrated circuits product catalogue. Also, by way of illustration, and not for purposes of limitation, embodiments of the present invention may be described at various points with respect to a web-based architecture, such as the architecture shown in FIG. 1.

Figure 8:
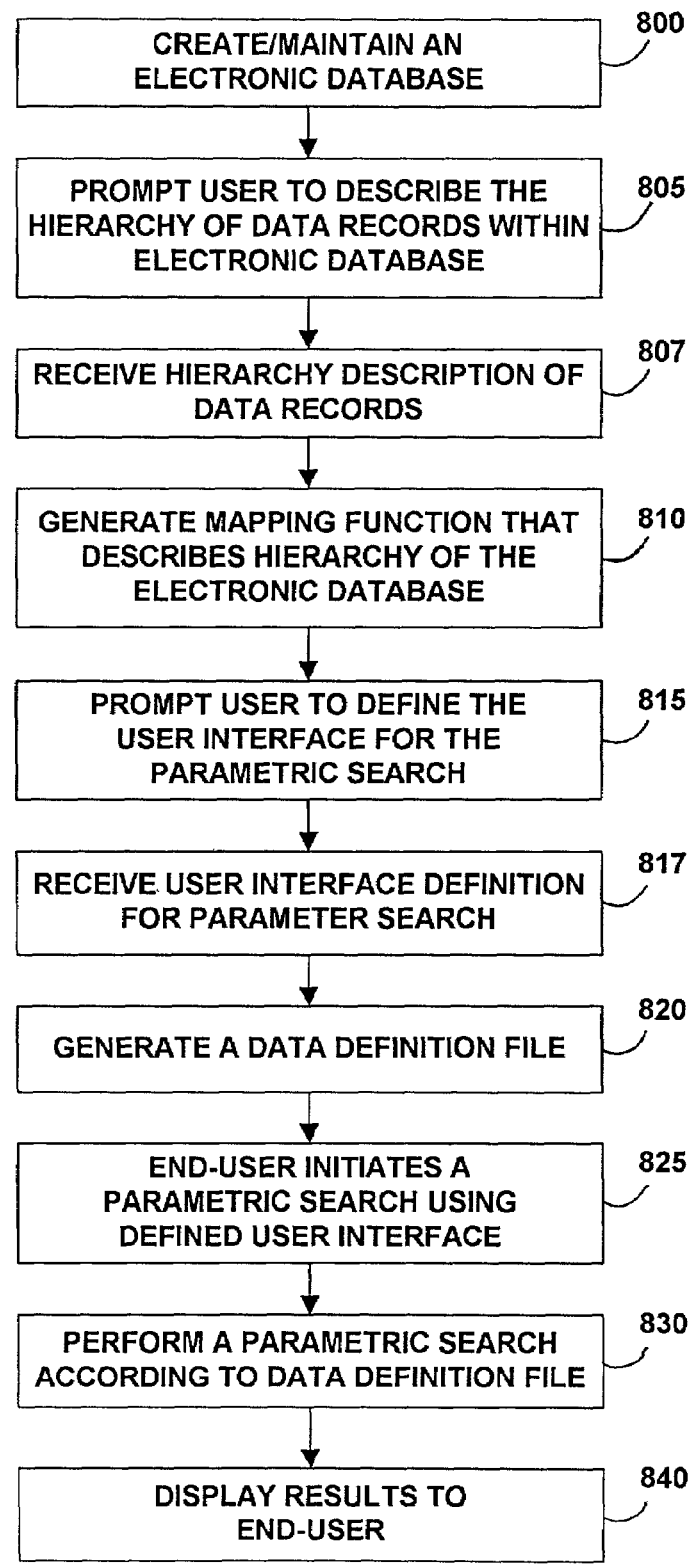
FIG. 8 is a generalized flowchart of illustrative steps involved in performing parametric searches in accordance with one embodiment of the present invention.

FIG. 8 is a generalized flowchart of illustrative steps involved in performing parametric database searches in accordance with one embodiment of the present invention. An electronic database is created and maintained by a user at step 800. For example, customer 1 may create a database of integrated circuits. The database (e.g. IBM's DB2 database, Microsoft's Access database or databases from Oracle, Sybase or Computer Associates, etc.) may be supported by database engine 404 (shown in FIG. 4). As part of its processing, search engine 406 may construct database queries that are used by database engine 404 to search customer 1's electronic database 401. Any embodiment of the present invention, however, is not limited to any of the database formats listed above or to any specific database format.

At step 805, the system may prompt the user to describe the hierarchy of the data records within the electronic database. The user may describe the hierarchy of the database using access device 115 over Internet 100 or communication network 150. The user may describe the hierarchy by, for example, entering descriptive information for each logical grouping of data records with the database in a text field, clicking on an icon, or using any other suitable graphical interface element. At step 807, the system may receive the hierarchy description of the data records within the electronic database from the user over Internet 100 or communication network 150.

At step 810, the system may generate a mapping function that describes the hierarchy of the electronic database. The mapping function may describe all the logical groupings of data records contained in the electronic database. The logical groupings may include all directories and sub-directories contained within the electronic database.

At step 815, the system may prompt the user to define the user interface for the parametric search. The user may define the user interface by, for example, entering text in an input field, clicking on a button or icon associated with a feature of the user interface, marking a check box, or using any other suitable graphical interface element. At step 817, the system may receive the user interface definitions for the parametric searches from the user over Internet 100 or communication network 150.

At step 820, the system may generate a data definition file that contains the user's selections for configuring the user-interface. At step 825, the system may prompt the end-user to initiate a parametric search by using a user-interface that may be defined by the data definition file. The end-user may initiate a parametric search by, for example, entering a product parameter in a text field, clicking on a link, button or icon associated with a parametric search, marking a check box, or using any other suitable graphical interface element.

At step 830, the system may perform a parametric search that was initiated by the end-user and may return the results of that parametric search to the end-user at step 840. The results of the parametric search may be displayed to the end-user using any suitable method, such as, for example, text, graphics, video, audio, any other suitable method, or any suitable combination thereof.

Figure 9:
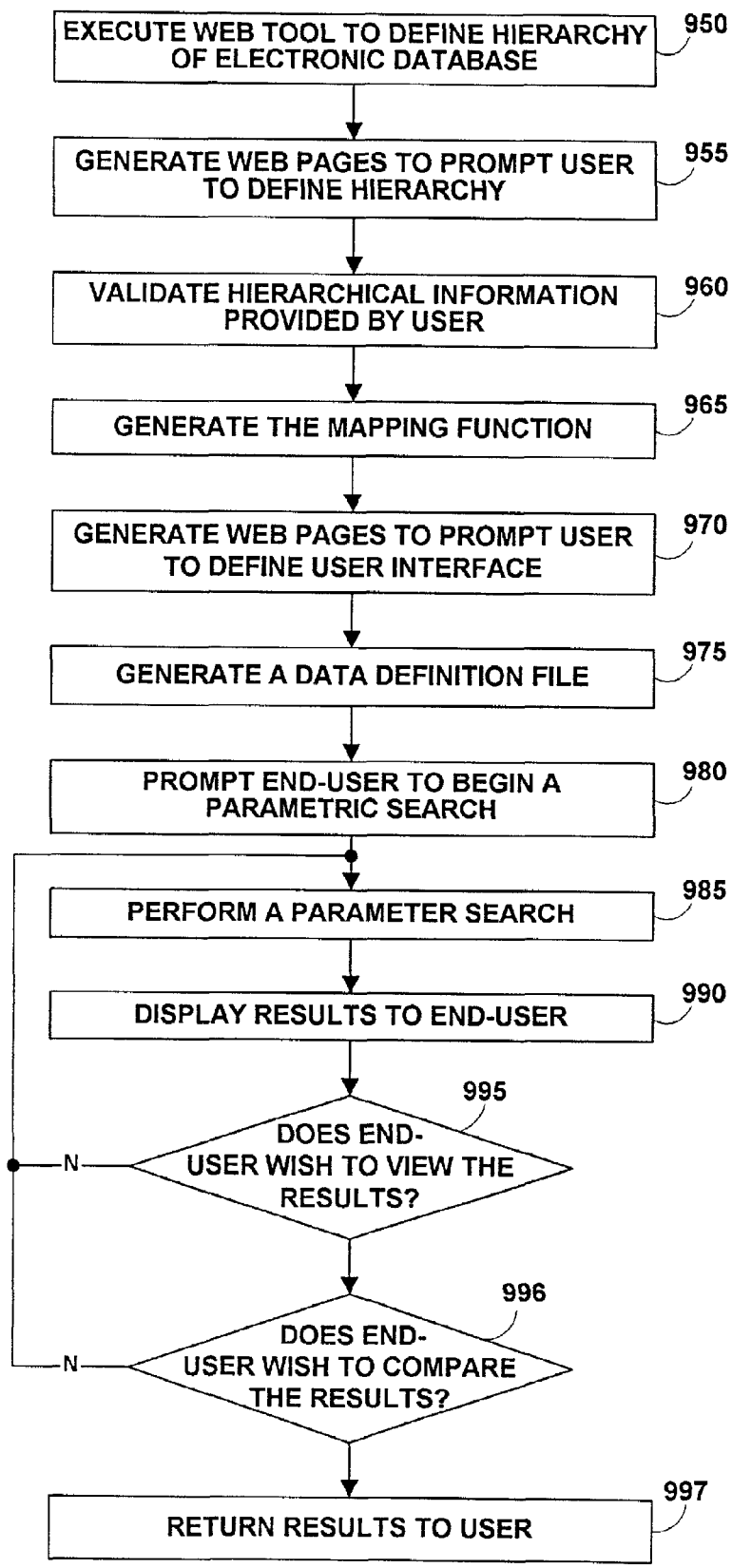
FIG. 9 is a more-detailed flowchart of illustrative steps involved in performing parametric searches in accordance with a web-based embodiment of the present invention.

FIG. 9 is a more detailed flowchart of illustrative steps involved in performing parametric database searches in accordance with one embodiment of the present invention.

At step 950, the system (e.g., Internet and application server 110) executes a web tool (such as web tool 407). Web tool 407 is a computer application that generates a mapping function between the hierarchical arrangement of data records within an electronic database and search engine 406 of FIG. 4. At step 955, to generate this mapping function, web tool 407 first generates one or more web pages which are transmitted to the end-user's access device, such as access device 115 using, for example, the HTTP protocol. These web pages may prompt the user to define the hierarchy of the data records within electronic database 401. The user may use access tool 115 to transmit the requested information back to web tool 407. At step 960, after receiving the requested information regarding the hierarchy of the data records within the electronic database, web tool 407 then executes a validation program to insure that the data records, as described by the user, conform to a set of validation rules used by search engine 406. If the data records conform to these validation rules, web tool 407 then generates the mapping function at step 965.

At step 970, the system may prompt the user to identify which parameters will be displayed to the end-user of the system at each successive iteration of the parametric search (e.g., by generating web pages that are provided by Internet and application server 110 to the user's access device). To make the parametric search both user-friendly and effective, this embodiment of the system only displays a limited number of parameters to the end-user during each iteration of the parametric search. The user may identify the parameters that are displayed during each iteration of the parametric search using, for example, access device 115.

The system prompts the user to describe the format in which these parameters will be displayed to an end-user of the system. The system may prompt the user as to the order in which the parameters are listed and the method of presentation for each parameter. User may select between various display options, such as a list box, check box, boolean field (e.g., Yes/NO, On/Off), any other suitable display option or combination of suitable display options.

For example, integrated circuits are fabricated in a variety of different packages (e.g. DIP, QCC, PGA, QFP, DMA). At step 970, the system may prompt the user to identify if product packaging will be a parameter that is displayed to the end-user of the system during the first iteration of the parametric search. If the user answers affirmatively, the system may then prompt the user to describe how the different types of packages are to be displayed to the user, such as using a list box, check box, pull down menu, etc.

At step 975, after the user has selected the display formats, the system may then store the user's selections in data definition file 405. This process may be repeated until the user has identified the parameters and their formats for each iteration of the parametric search.

At step 980, after data definition file 405 has been created, the system may generate web pages to prompt the end-user to begin a parametric search by selecting a category of products within electronic database 401 to search. The end-user may select a category, such as microprocessors.

The system may perform the requested parametric search for the selected category at step 985. For example, Internet and application server 110 may query database engine 404 for all records within that category of electronic database 401. Internet and application server 110 may then instruct database engine 404 to retrieve the requested records. Database engine 404 may then transmit the records to Internet and application server 110. Internet and application server 110 may then count the number of records retrieved.

The system may then access the data definition file to determine the parameters that the user selected for the first iteration of the parametric search and may display those parameters to the end-user on access device 115. The end-user of the system may then select the parameters of interest to him. The end-user also may select a value for each selected parameter from a predefined list of values or the end-user may type a value or range of values for each selected parameter. The end-user may then transmit this information to Internet and application server 110 using access device 115. Internet and application server 110 may then query database engine 404 for all records within the electronic database that satisfy the search criteria inputted by the end-user. Internet and application server 110 may then instruct database engine 404 to retrieve the requested records. Database engine 404 may then transmit the records to Internet and application server 110. Internet and application server 110 may then count the number of records retrieved.

At step 990, the system may display the results of the parametric search to the end-user. For example, Internet and application server 110 may transmit the number of records that satisfied the end-user's search request and access device 115 may display the parameters that the database administrator selected for the second iteration of the parametric search at step 815 of FIG. 8.

At step 995, if the number of records that satisfied the end-user's search request is less than a first predefined value (e.g. 100), the system may provide the end-user with the option of viewing the results of that search. If the end-user elects to view the results, the system may provide a list of the products that satisfied the end-user's search criteria. These products may be displayed, for example, by the end-user's access device 115. The end-user may then select a specific product from the list to obtain further information regarding that product.

At step 996, if the number of records in the search results is less than a second predefined number (e.g. 10), the system may provide the end-user with the option of viewing a comparison of those products in a side-by-side format or any other suitable comparison format. If the end-user elects to view a side-by-side comparison of those products, the system may provide the comparison, for example, to the end-user's access device 115 at step 997.

When the end-user elects not to view the results at step 995 and step 996, the system may return the end-user to step 985 in order to refine the end-user' s parametric search further. At step 985, the end-user selects additional parameters of interest and selects or types a value or range of values for each selected parameter and the process repeats.

Figure 10:
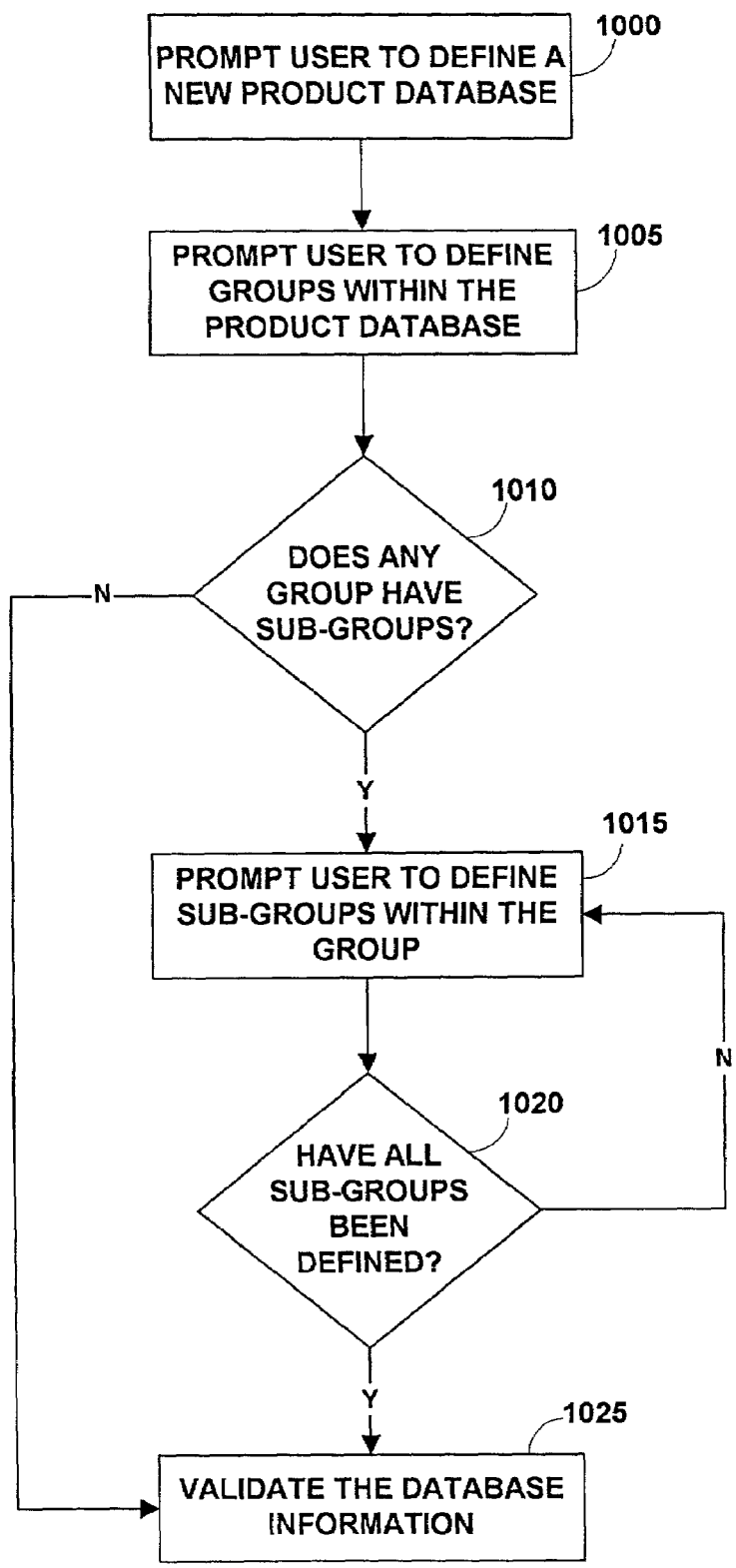
FIG. 10 is a flowchart of illustrative steps involved in defining hierarchical structures of an electronic database in accordance with one embodiment of the present invention.

FIG. 10 is a more detailed flowchart of the steps in accordance with one embodiment of the present invention that are involved in step 805 of FIG. 8. The steps shown in FIG. 10 are illustrative and may be combined or performed in any suitable order.

At step 1000, the system may prompt the user to define a new electronic database. The user may define the new database using access device 115 over Internet 100 or communication network 150. The user may define the electronic database by, for example, entering information in a text field, clicking on a button or an icon associated with a new database, marking a click box for a new directory, or using any other suitable graphical user element.

At step 1005, the system may prompt the user to define any hierarchical groupings of data records within the database. For example, the user may describe the hierarchical grouping of data records to Internet and application server 110 using access device 115 over Internet 100 or communication network 150. The hierarchical grouping may include all directories of data records within the electronic database. The user may define the groups by, for example, entering text in an input field, clicking on a button or icon associated with a new group, marking a check box for a new group, or using any other suitable graphical user interface.

At step 1010, the system may prompt the user to determine if any groups within the electronic database have hierarchical sub-groups. If there are such sub-groupings, at step 1015, the system may prompt the user to define the sub-groupings within the database. For example, the user may describe the sub-groupings within the database using access device 115 over Internet 100 or communication network 150. The sub-groupings may include all sub-directories within the directories of the electronic database. This may be an iterative process if the electronic database has multiple layers of sub-groups. The user may define the sub-groups by, for example, entering text in an input field, clicking on a button or icon associated with a new sub-group, marking a check box for a new sub-group, or using any other suitable graphical user interface.

At step 1020, the system may prompt the user to determine if all sub-groups within the electronic database have been defined. If there are still sub-groups to be defined the processing returns to step 1015. If all the groups and sub-groups have been defined, at step 1025, the system verifies or validates the hierarchical information provided by the database administrator. If the hierarchical information conforms to the database format being used by the user, then the hierarchical information is accepted by the system.

Figure 11:
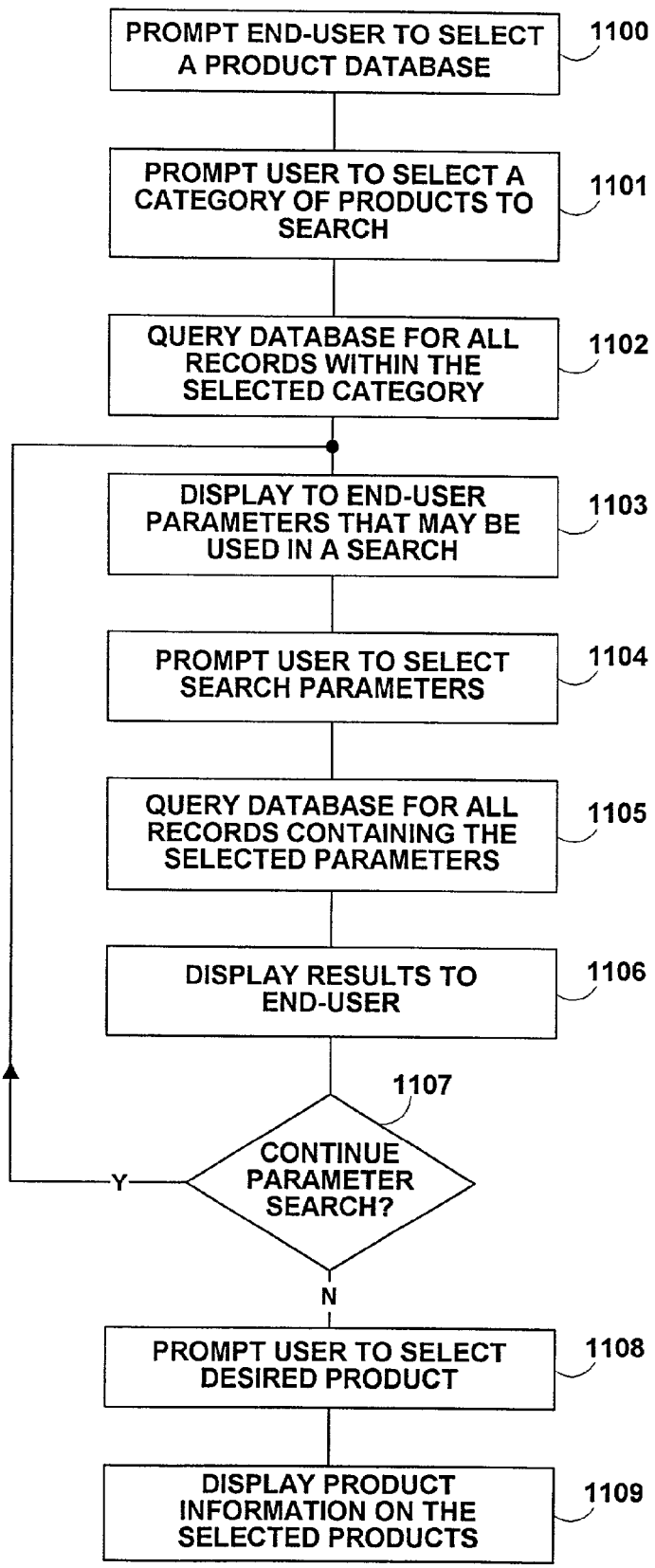
FIG. 11 is a generalized flowchart of illustrative steps for a parametric search that may be performed in accordance with one embodiment of the present invention.

FIG. 11 is a generalized flowchart of illustrative steps involved in performing a parametric search (i.e. step 830 of FIG. 8) on an electronic database in accordance with one embodiment of the present invention.

At step 1100, the system may prompt the end-user to select an electronic database to search. The system prompts the end-user by providing an interactive display to the end-user. The interactive display may be a web page, an application display, a pop-up or any other suitable display, or combination of suitable displays.

At step 1101, the system may prompt the user to select a category of products within the electronic database to search. The end-user may select a category of products by, for example, entering the name of a category in an input field, clicking on a link, button or icon associated with the category, marking a check box, or using any other suitable approach, or combination of suitable approaches.

At step 1102, the system queries the electronic database for all records within the selected category. The system may construct a database query that is suitable for the database engine that maintains the electronic database that is to be searched. The electronic database and its database engine may reside on the same computer system as the system, may reside on a remote system or may be distributed on several systems. In embodiments in which the electronic database engine resides on a remote system, the system may query the remote database by making remote calls to the database engine on whatever remote system that it may reside.

At step 1103, the system may provide to the end-user a selection of parameters that may be used in a parametric search. The system may display the parameters to the end-user using any suitable content. The parameters may be presented using, for example, text, graphics, video, audio, animations, tactile content, olfactory content, other suitable presentations, or any suitable combination thereof.

At step 1104, the system may prompt the end-user to select the search parameters. The end-user may select parameters by, for example, entering the name of a parameter in an input field, clicking on a link, button or icon associated with a parameter, marking a check box, or using any other suitable approach, or combination of suitable approaches.

At step 1105, the system may query the electronic database for all records within the selected category that contain the selected parameters. The system may construct a database query that is suitable for whatever type of database engine that is maintaining the electronic database. The electronic database and its database engine may reside on the same computer system as the system, may reside on a remote system or may be distributed on several computer systems. In embodiments in which the electronic database engine resides on a remote system, the system may query the remote database by making remote calls to the database engine on whatever remote system that the database engine may reside.

At step 1106, the system may display to the end-user the results of the parametric search. The system may display using any suitable method the number of products or a listing of the products that satisfied the search parameters of the end-user. The results may be presented using, for example, text, graphics, video, audio, animations, tactile content, olfactory content, other suitable presentations, or any suitable combination thereof.

At step 1107, the end-user may continue the parametric search by selecting additional parameters to refine the search further. The end-user may continue the parametric search by, for example, clicking on a link, button or icon, marking a check box, or using any other suitable approach. If the end-user elects to continue the parametric search, the processing returns to step 1103.

If the user elects not to continue the parametric search, at step 1108, the system may prompt the end-user to select a product from the results that were presented to the end-user in step 1106. The system may prompt the user by presenting the products to the end-user using any suitable method. The results may be presented using, for example, text, graphics, video, audio, animations, tactile content, olfactory content, other suitable presentations, or any suitable combination thereof. The end-user may select the product or products by, for example, entering the name of the product or products in an input field, clicking on a link, button or icon associated with a product or products, marking a check box, or using any other suitable approach, or combination of suitable approaches.

At step 1109, the system may display product information on any of the products that were selected by the end-user. The system may display the product information using any suitable method. The product information may be presented using, for example, text, graphics, video, audio, animations, tactile content, olfactory content, other suitable presentations, or any suitable combination thereof.

Figure 12A:
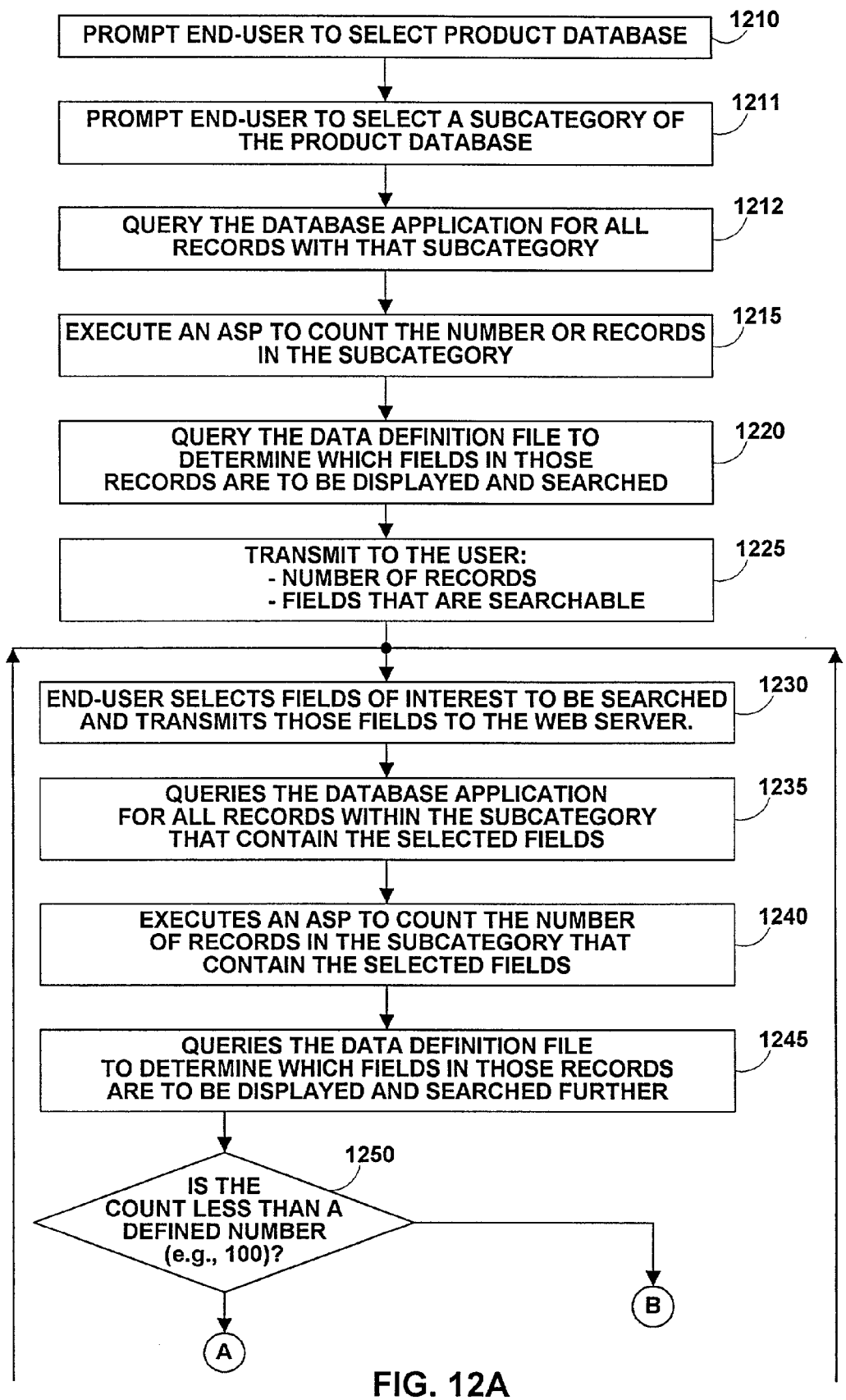
FIGS. 12A and 12B are more detailed flowcharts of illustrative steps for a parametric search that may be performed in accordance with one embodiment of the present invention.
Figure 12B:
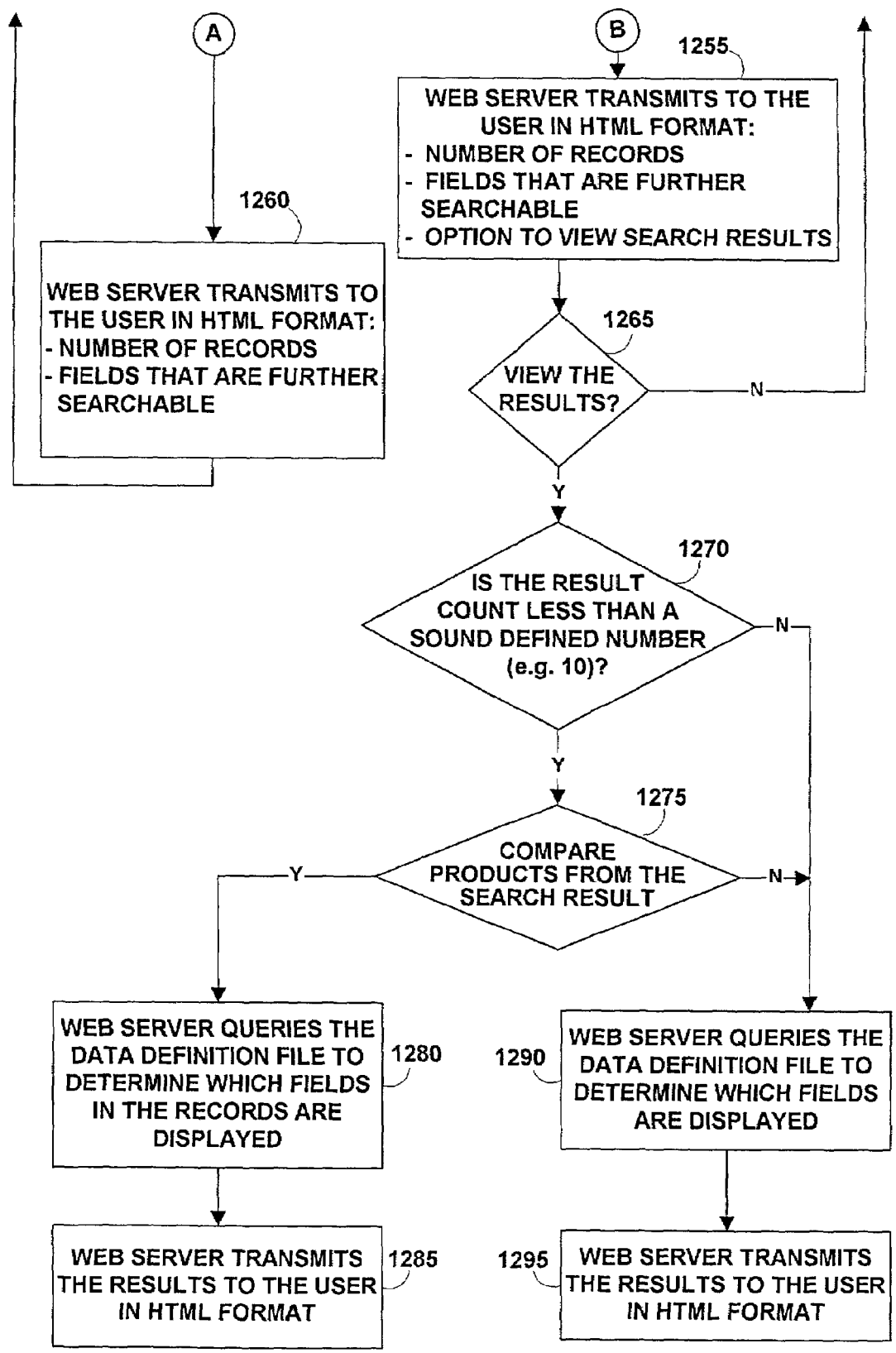

FIGS. 12A and 12B are more detailed flowcharts of steps involved in step 830 of FIG. 8. At step 1210, the system prompts an end-user to select a product database. An end-user may initiate client application 520 to retrieve a web page, an application display, a pop-up or any other suitable display from Internet and application server 110. The retrieved web page, for example, may describe the contents of electronic database 401 to the end-user. For example, the web page may display on the end-user's access device 115 the different subcategories of electronic database 401. Each displayed subcategory on the web page may be, for example, a HyperText link. The web page may prompt the user to select any one of the listed subcategories by clicking on the HyperText link, clicking on a button or icon associated with the subcategory or using any other suitable method for selecting the subcategory. The web page may also provide the end-user with the option of immediately selecting a specific product, instead of selecting a subcategory. If an end-user has already identified a product and only wishes to obtain detailed information about that product, the web page may prompt the user, for example, to type in some identifying information regarding that product, such as a part number. After the end-user inputs the identifying information, client application 520 may transmit the information to Internet and application server 110, which then may query database engine 404 to retrieve the requested data record. Internet and application server 110 may then transmit the record to the user's access device 115.

By way of illustration, and not for purposes of limitation, the following description will describe client application 520 using the option in which an end-user selects one of the displayed subcategories of electronic database 401 to initiate a parametric search. At step 1211, the system may prompt the end-user 410 to select a subcategory within electronic database 401. Client application 520 may transmit this selection to the system using, for example, HTTP. The system may then receive the category selection information from client application 520. At step 1212, the system may then query database engine 404 to retrieve all records within electronic database 401 that are contained in the selected subcategory.

At step 1215, the system may count the number of records in the chosen subcategory by, for example, executing an ASP. At step 1220, the system may query data definition file 405 to determine which parameters from those data records are to be displayed to the end-user and used as search parameters. At step 1225, the system may transmit to the end-user's access device 115, for example in HTML format, the number of records in the subcategory and the parameters that are searchable during this iteration of the parametric search.

At step 1230, the end-user may select the parameters from the searchable parameters that are of interest to him. The end-user may then select values for those parameters that are appropriate to the parametric search. Parameter values may be predefined and selected by the end-user from pull-down menus, list boxes, check boxes, radio buttons, any other suitable display format or combination of display formats. Parameter values may also be selected by the end-user, for example, by typing in a value or a range of values for each parameter. Client application 520 may then transmit the parameters and parameter values selected by the end-user to the system. It may be useful to have the end-user select parameter values from a pull-down menu or a list box as opposed to typing in values. Some embodiments of the present invention may only display values of parameters in its pull-down menus or list boxes that are contained in the subcategory. A parameter value provided by the end-user may not correspond with any records in the subcategory. Accordingly, a "typed-in" parameter value may cause the parametric search to produce no records that match the requirements of the end-user.

The system receives the category selection information from client application 520. At step 1235, the system may then query database engine 404 to retrieve all records within electronic database 401 that contain the selected parameters and the selected parameter values. Database engine 404 may transmit the records to the system. At step 1240, the system may execute an ASP to count the number of records in the chosen subcategory. At step 1245, the system may query the data definition file 405 to determine which fields from those records are to be displayed to the end-user and used as search parameters.

At step 1250, the web server may compare the count generated by the ASP with a first predefined number (e.g. 100). If the count is greater than the first predefined number, the system may transmit to the end-user's access device 115, for example in HTML format, the number of records and the fields in those records that are searchable during the next iteration of the parametric search. At this point, the processing of the system may loop back to step 1230. If the count is less than the first predefined number at step 1255, the web server may transmit to the user's access device 115, for example in HTML format, the number of records and the fields in those records that are searchable as well as an option to view the results of the search. At step 1265, the system may prompt the end-user as to whether the end-user wishes to view the results. If the end-user selects no, then the processing of the system may loop back to step 1230. If the end-user selects yes, at step 1270 the system may compare the count generated by the ASP with a second predefined number (e.g. 10). If the count is greater than the second predefined number, the web server at step 1290 may access data definition file 405 to determine which fields in the search results are to be displayed to the end-user. At step 1295, the system transmits the results to the end-user's access device 115 in a format that may be dictated by the data definition file. If the count is less than the second predefined number, the system at step 1275 may prompt the end-user as to whether the end-user wishes to view the results in a comparison format, such as, for example, a side-by-side comparison. If the end-user selects no, then the processing continues at step 1290. If the end-user selects yes, then the system at step 1280 may access data definition file 405 to determine which fields in the search results may be displayed to the end-user in a side-by-side comparison or in any other suitable display format. At step 1285, the system may transmit the results to the end-user's access device 115 in the format that may be dictated by data definition file 405.

FIGS. 13 through 41 show illustrative displays for providing various features of some embodiments of the present invention. The displays may include any suitable content such as text, graphics, audio, video, animation, other suitable content, or a suitable combination thereof. The displays of FIGS. 13 through 41 may be web pages or any other display suitable to the chosen system implementation, such as application displays, pop-ups, or other suitable displays.

Displays, such as those shown in FIGS. 13 through 41, may provide users with access to features of the system using any interface construct suitable for the chosen system implementation. Suitable interface constructs may include, for example, graphical interface elements. Suitable graphical interface elements may include, for example, push buttons, check boxes, radio buttons, scroll bars, drop-down menus or lists, input fields or text boxes, links, or any other graphical interface element suitable to the chosen access device 115 or personal computer 120. Audio interface constructs may also be used if desired. System features may include, for example, a library manager, a metrics manager, help information, or any other suitable information.

An illustrative embodiment of step 805 of FIG. 8 in which a user may define the hierarchical relationship of the data records within an electronic database using web tool 407, for example, is shown in FIGS. 9 through 20.

FIG. 13 is an embodiment of a display that may be retrieved from the system and displayed to the user. FIG. 13 may prompt the user to provide the name of the user's company by entering information in text field 1301, by voice input, or by any other suitable method. Web tool 407 may also prompt the user to provide a description and name for the electronic database by entering information in text fields 1302 and 1303, respectively, by voice input, or by any other suitable method. In FIG. 14, the user has provided "Customer 1" in field 1401; "electronic components" in field 1402; and "electronic components" in field 1403. At this point, the user may select the "Submit" field 1404, may select the "enter" key or may use any other suitable method to transmit this information to web tool 407 using access device 115.

In this example, in response to the "Submit" command of FIG. 14, web tool 407 may provide the user with a new display, which is shown in FIG. 15. FIG. 15 may display the information just provided by the user in fields 1501 through 1503. FIG. 15 may also display icon 1504, or any other graphical user interface, for customer 1. Web tool 407 may allow a user to view all databases that have been defined for customer 1 by, for example, selecting icon 1505. In this example, in response to the user's selection of icon 1505, web tool 407 may retrieve a new display for the user. In this example, this new display, which is shown in FIG. 16, contains all the databases that have been defined for customer 1. For example, FIG. 16 displays that only the "electronic components" database, shown in field 1601, has been defined.

At this point, a user may define any hierarchical structure within the "electronic components" database. In this example, selecting "New Group" field 1602 causes web tool 407 to display FIG. 17, or any other suitable display, to the user. In FIG. 17, web tool 407 may prompt the user to provide, for example, a name and description for the first group within the "electronics component" database by entering information in text fields 1701 and 1702, respectively, or by entering information using any other suitable method. In FIG. 18, the user has provided "memory" in field 1801; and "memory devices" in field 1802. At this point, the user may select the "Submit" field 1803, the "enter" key or another suitable method to transmit this information to web tool 407 using access device 115.

Figure 19:
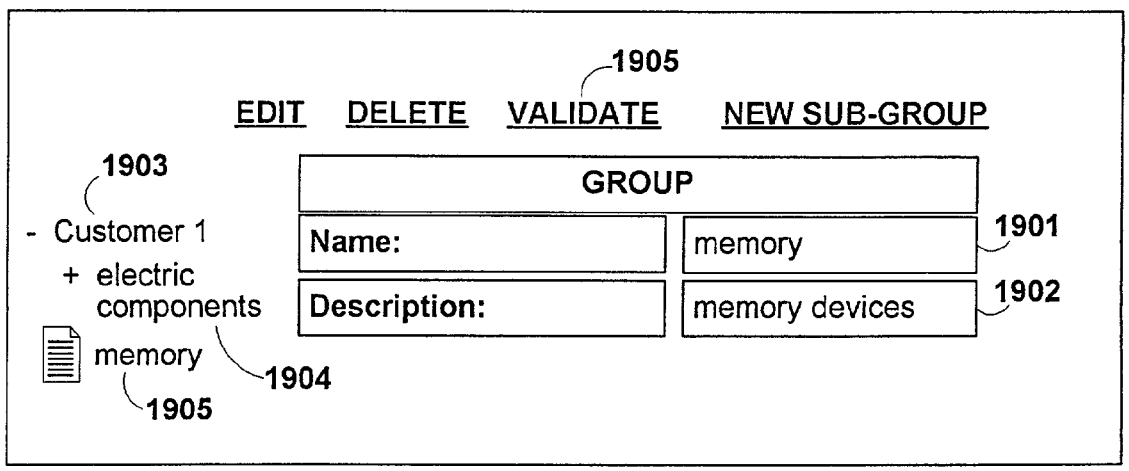
Figure 20:
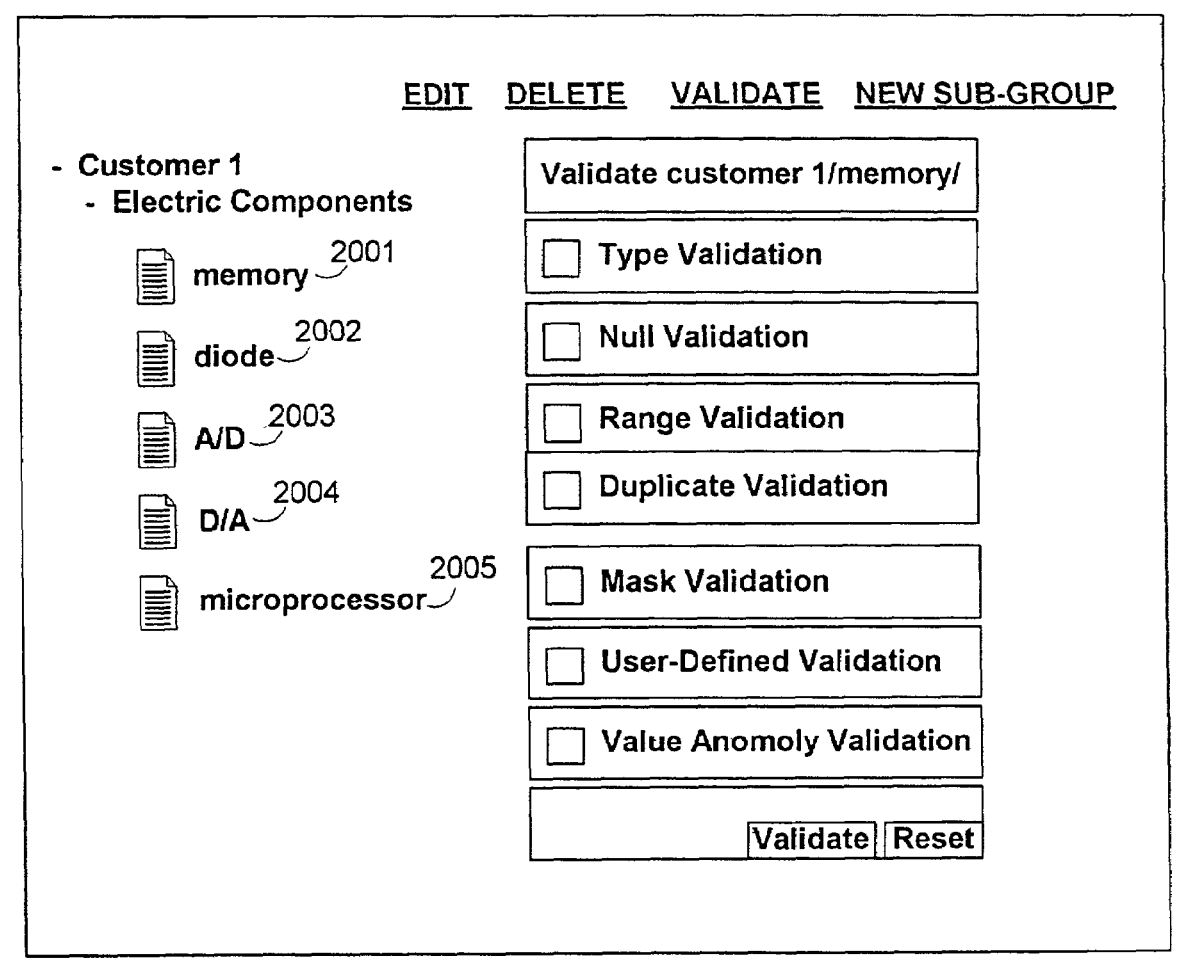

In this example, in response to the "Submit" command of FIG. 18, web tool 407 may provide a new display to the user as shown in FIG. 19. FIG. 19 may display the information just provided by the user in fields 1901 and 1902. FIG. 19 may also display icons 1903 through 1905, or any other suitable graphical interface elements, to show the hierarchical structure of the electronic components database. This process of defining sub-groups may continue until the user has completely defined the entire hierarchy of the data records within the electronic components database. In this example, FIG. 20 shows an electronics components database that contains 5 subgroups: memory 2001; diode 2002; A/D 2003; D/A 2004; and microprocessor 2005.

An illustrative embodiment of step 815 of FIG. 8 in which a user may define the user interface for the parametric search is shown in FIGS. 21 through 28.

FIG. 21 is an example of an embodiment of a display that may be retrieved from Internet and application server 110 and displayed to the user on access device 115. In FIG. 21, web tool 407 may prompt the user to provide the display characteristics for a parameter that may be used in a parametric search. FIG. 21 may display a wide variety of options for formatting the user interface of the parametric search engine. For example, Visibility field 2101 may allow the user to specify which iterations of the search will contain this parameter as a searchable parameter. For example, the parameter may be "Hidden," "Searchable on the initial screen", "Searchable on subsequent screens" or "Displayed but not used in the parametric search." In another example, Presentation field 2102 may allow the user to specify how the range of values for this parameter may be displayed to the end-user. For example, the values may be shown in a "List Box," "Drop Down," "Check Box" or any other suitable graphical interface element. In a further example, Boolean Display field 2103 may allow the user to specify how boolean values, if applicable, are displayed to the end-user. For example, the boolean values may be expressed as "Yes/NO," "True/False," "On/Off" or any other suitable boolean expression.

In this example, FIG. 21 displays the settings that a user selected for a "Temperature Range" parameter. This Temperature Range parameter may be used, for example, in a parametric search for a microprocessor. In FIG. 21, Presentation field 2102 has been selected as a "Check Box." FIG. 22 displays the initial display of a parametric search for a microprocessor that used the setting for Temperature Range that were shown in FIG. 21. The values for the Temperature Range field 2201 are displayed in check box format.

In this embodiment of the present invention, the user may change the user interface at any time by executing web tool 407 and then executing the "Edit" parameters function 1703 (shown in FIG. 17) within web tool 407. As shown in the example of FIG. 23, the user has changed the Presentation field 2301 value from a "Check Box" to a "List Box." After making this alteration, the user may select, for example, the "Submit" field 2302 to execute the changes. In response to the submit command, web tool 407 may update database definition file 405, which causes the initial display for a microprocessor parametric search to be provided as shown in FIG. 24. FIG. 24 shows the Temperature Range field 2401 as a list box instead of a check box.

This process of altering the user interface for the parametric search engine may be performed on any parameter. FIG. 25 shows the settings for a Ext. Data Bus (Bits) parameter that is used in a parametric search for a microprocessor in accordance with this embodiment of the present invention. Visibility field 2501 of FIG. 25 may be selected to be "Searchable on initial screen." FIG. 26 shows the initial display (i.e. screen) for this parametric search and Ext. Data Bus (Bits) field 2602 is visible and searchable on this screen. Again, in this example, the user may alter the user interface show in FIG. 26 by invoking web tool 407 and executing Edit parameter function 1703. In this example, FIG. 27 shows the display for editing the display characteristics of the Ext. data Bus (Bits) parameter. As shown in FIG. 27, Visibility field 2701 may be selected to be "Hidden." The user may select "Submit" field 2702, the enter key or any other suitable command, to execute this change. The results of this change is shown in FIG. 28, which shows that the Ext. Data Bus (Bits) has been removed from the initial display of a parametric search for a microprocessor.

An illustrative embodiment of the present invention that performs a parametric search of an integrated circuits product catalogue is shown in FIGS. 29 through 41.

FIG. 29 is an example of an embodiment of a display that may be retrieved from Internet and application server 110 and provided to end-user on the end-user's access device 115. FIG. 29 describes the contents of the integrated circuits product catalogue that may be searched in accordance with one embodiment of the present invention. In this example, each underlined term in FIG. 29 may be a HyperText link that represents a sub-category of the integrated circuits database. For example, "Chip Sets" 2901, "Gate Array" 2902 and "Microprocessors/Microcontrollers" 2903 are sub-categories of the integrated circuits product catalogue. If desired, sub-categories may also be selected using push buttons, check boxes, pull-down menus or any other suitable graphical interface element.

FIG. 29 also has a "Find It" 2904 feature which may allow the end-user to type in, for example, a specific part number to immediately retrieve information relating to that part number. This feature does not perform a parametric search but rather performs a table look-up search for the specified part number. By way of illustration, and not for purposes of limitation, FIGS. 29 through 41 will describe an embodiment of the present invention using the option in which an end-user selects one of the displayed subcategories of integrated circuits to initiate the parametric search.

In FIG. 29, the end-user may initiate the parametric search by selecting the "Microprocessors/Microcontrollers" 2903 HyperText link, or any other suitable graphical interface element. In response to the user's selection of "Microprocessors/Microcontrollers" 2903, Internet and application server 110 may provide the end-user with a new display, which is shown in FIG. 30. FIG. 30 displays, in the "Number Found" 3001 field, the total number of microprocessors and microcontrollers that are contained in the integrated circuits database. In this example, the parametric search resulted in 5,610 microprocessors and microcontrollers. Fields 3002–3010 may represent the parameters that the user selected as the parameters that are searchable during the first iteration of the parametric search. There are additional parameters that may be searched, but the user selected these as the most useful to begin the parametric search. In this example, each of the fields 3002–3010 may be divided into two columns. In the first column, the name of the parameter may appear. In the second column, searchable values for those parameters may be shown.

To continue the parametric search, the end-user may select any number of parameters and any number of parameter values as shown in FIG. 31. In FIG. 31, the end-user has selected "Temperature Range" 3101 to be "Mil" and "Category" 3102 to be "Microprocessors." These selections may be indicated with a check mark as shown in FIG. 31 or may be indicated by any other suitable display method. At this point, the end-user may select the "Search" field 3103 which causes client application 520 to transmits these selections to Internet and application server 110. In response to the end-user's selections of "Temperature Range" 3101 and "Category" 3102, the system may provide the end-user with a new display, which is shown in FIGS. 32A and 32B. FIGS. 32A and 32B display the total number of microprocessors in the integrated circuits database that satisfied the selected search criteria. This number is shown in the "Number Found" 3201 field. In this example, the parametric search resulted in 78 microprocessors. Fields 3202–3224 may represent the parameters that the user selected as the parameters that are searchable during the second iteration of the parametric search. FIGS. 32A and 32B may also indicate to the end-user all the parameters and corresponding values that the end-user has selected during this search. In FIGS. 32A and 32B, this is shown in fields 3204 and 3207 with check marks, but may be shown using any other suitable display format. In FIGS. 32A and 32B, a "View List of Devices" 3225 field is also shown. This indicates to the end-user that 78 microprocessors is less than the first predefined number chosen by the user. As a result, the end-user may view all 78 records at this point in the search. By way of illustration, and not for purposes of limitation, in FIGS. 33 through 41, the end-user will continue to refine the parametric search.

To continue with the second iteration of the parametric search, the end-user may select any number of parameters and any number of parameter values as shown in FIGS. 33A and 33B. In FIGS. 33A and 33B, the end-user has selected "Ext. Data Bus (Bits)" 3301 to be "32", "Int. Data Bus (Bits)" 3302 to be "32" and "Process Technology" 3303 to be "CMOS." These selections are indicated with check marks in FIGS. 33A and 33B. At this point, the end-user may select the "Search" 3304 field which causes client application 520 to transmits these selections to the system. In response to the end-user's selections of "Ext. Data Bus (Bits)" 3301, "Int. Data Bus (Bits)" 3302 and "Process Technology" 3303, the system may provide the end-user with a new display which is shown in FIGS. 34A and 34B. FIGS. 34A and 34B display the total number of microprocessors in the integrated circuits database that satisfied the selected search criteria. This number is shown in the "Number Found" 3401 field. In this embodiment, the parametric search resulted in 21 microprocessors. Fields 3402–3422 may represent the parameters that the user selected as the parameters that are searchable during the third iteration of the parametric search. FIGS. 34A and 34B also may indicate to the end-user all the parameters and corresponding values that the end-user has selected during this parametric search. In FIGS. 34A and 34B, this is shown in fields 3404, 3407, 3408, 3409, and 3412 with check marks, but may be shown using any other suitable display format.

To continue with the third iteration of the parametric search, the end-user may select any number of parameters and any number of parameter values as shown in FIGS. 35A and 35B. In FIGS. 35A and 35B, the end-user has selected the "Instruction Length" 3501 to be 32. This selection may be indicated with any suitable display format. At this point, the end-user may select the "Search" 3502 field which causes client application 520 to transmits these selection to the system. In response to the end-user's selection of "Instruction Length" 3501, the system may provide the end-user with a new display, which is shown in FIGS. 36A and 36B. FIGS. 36A and 36B display the total number of microprocessors in the integrated circuits database that satisfy the selected search criteria. This number is shown in the "Number Found" 3601 field. In this example, the parametric search resulted in 6 microprocessors. Fields 3602–3620 may represent the parameters that the user selected as the parameters that are searchable during the fourth iteration of the parametric search. FIGS. 36A and 36B also indicate to the end-user all the parameters and corresponding values that the end-user has selected during this search. In FIGS. 36A and 36B, this is shown in fields 3604, 3606, 3607, 3608 and 3611 with check marks. In FIG. 36, a "Compare Results" 3622 field is also shown. This indicates to the end-user that 6 microprocessors is less than the second predefined number chosen by the user. As a result, the end-user may view in a side-by-side comparison, or any other type of comparison format, the 6 records at this point in the search.

FIGS. 37A, 37B and 38 show the displays involved in the fourth iteration of the parametric search. FIG. 38 displays the total number of microprocessors in the integrated circuits database that satisfy the selected search criteria. This number is shown in the "Number Found" 3801 field. In this embodiment, the parametric search resulted in 2 microprocessors. At this point, the end-user may wish to view the results of the search by selecting the "View List Of Devices" 3802 field, or executing any other appropriate command. In response to this selection, the system may provide a display that lists the devices as shown in FIG. 39. FIG. 39 lists both the manufacturer 3901 and the part number 3902 associated with each device that satisfied the end-user's parametric search. The end-user may then select any listed manufacturer or part number for even further details. For example, if the user selects "Advanced Micro" in FIG. 39, the system may provide FIG. 40 which lists contact information regarding Advanced Micro Devices, Inc. Instead of viewing the results of the parametric search in this format, the end-user may wish to view a side by side comparison of the search results by selecting "Compare Results" field 3803 in FIG. 38. In response to this selection, the system may provide a web page displaying a side-by-side comparison of the parts as shown in FIG. 41. If the end-user wants further information on any of the listed parts, the end-user may select field 4101, field 4102 or any other suitable field for more details about the listed parts.

While many of the features of the system have been described in connection with a parametric search of an integrated circuits product catalogue, the features may be provided in connection with a parametric search of other types of products (e.g., automobile parts, pharmaceutical products, construction materials, or any other suitable products or combination of products). One skilled in the art will appreciate that the present invention can be practiced by other than the described embodiments, which are presented for purposes of illustration and not of limitation, and the present invention is limited only by the claims which follow.

What is claimed is:

1. A method for performing parametric searches on an electronic database without converting the database to a standard format, comprising:
   receiving at a parametric search engine a first data definition file that describes the structure of records in an electronic database, wherein the first data definition file is stored separately from the parametric search engine;
   receiving a user selection to perform a parametric search on a subcategory of records in the electronic database;
   displaying a first set of search parameters selectable by an end-user for a first iteration of the parametric search on the selected subcategory of records;
   parametrically searching the electronic database with the parametric search engine without initially converting the database to a standard format using the first data definition file to generate database queries based on parameters selected by the end-user from the first set of parameters;
   displaying results of the first iteration of the parametric search simultaneously with a second set of parameters selectable by the end-user for a second iteration of the parametric search on the selected subcategory of records, the displayed results including the display of the number of database entries that match the parameters selected by the end-user from the first set of parameters, wherein the second set of parameters includes parameters in the first set of parameters and parameters not included in the first set of parameters;
   parametrically searching the electronic database with the parametric search engine without initially converting the database to a standard format using the first data definition file to generate database queries based on parameters selected by the end-user from the second set of parameters;

displaying results of the second iteration of the parametric search;

receiving at the parametric search engine a second data definition file that describes a new structure for the records in the electronic database file, wherein the second data definition file is stored separately from the parametric search engine;

parametrically searching the electronic database with the parametric search engine without converting the database to a standard format using the second data definition file to generate database queries;

electronically downloading the electronic database; and parametrically searching the electronic database using the second data definition file to generate database queries comprises parametrically searching the electronic database without re-downloading the electronic database.

2. The method defined in claim 1, further comprising:

receiving at the parametric search engine a data definition file that describes the structure of a second electronic database, wherein the data definition file for the second electronic database is stored separately from the parametric search engine; and parametrically searching the second electronic database with the parametric search engine without converting the database to a standard format using the data definition file for the second electronic database to generate database queries.

3. The method defined in claim 1, further comprising prompting the user to enter search parameters for parametrically searching the electronic database using a user access device.

4. The method defined in claim 1, wherein the electronic database is maintained by a user.

5. The method defined in claim 1, further comprising:

receiving the electronic database; and storing the electronic database on a server remote from a user.

6. The method defined in claim 5, wherein:

the method further comprises providing database queries to a database engine that is remote from the user; and parametrically searching the electronic database with the first and second data definition files comprises parametrically searching the electronic database on the remote server with the database engine using the queries.

7. The method defined in claim 5, wherein:

the method further comprises providing database queries to a database engine that is local to the user; and parametrically searching the electronic database with the first and second data definition files comprises parametrically searching the electronic database on the remote server with the database engine using the queries.

8. The method of claim 1, further comprising:

receiving interface definitional information from a user access device;

generating an interface for an end-user in accordance with the interface definitional information to allow the end-user to parametrically search an electronic database using the parametric search engine;

receiving search commands from the end-user;

performing a parametric search using the parametric search engine in response to the search commands; and displaying results of the parametric search to the end-user.

9. The method defined in claim 8, further comprising:

prompting the end-user to enter search commands using an access device associated with the end-user for parametrically searching the electronic database.

10. The method defined in claim 8, further comprising:

prompting the user to select a format for displaying the results of the parametric search using the user access device.

11. The method defined in claim 10, further comprising:

displaying the results of the parametric search to the end-user on an access device associated with the end-user in accordance with the format selected by the user.

12. The method defined in claim 8, further comprising:

receiving the electronic database; and storing the electronic database on a server remote from the user.

13. The method defined in claim 8, wherein the electronic database is maintained by the user.

14. A system for performing parametric searches on an electronic database without converting the database to a standard format, comprising:

means for receiving at a parametric search engine a first data definition file that describes the structure of records in an electronic database, wherein the first data definition file is stored separately from the parametric search engine;

means for receiving a user selection to perform a parametric search on a subcategory of records in the electronic database;

means for displaying a first set of search parameters selectable by an end-user for a first iteration of the parametric search on the selected subcategory of records;

means for parametrically searching the electronic database with the parametric search engine without initially converting the database to a standard format using first data definition file to generate database queries based on parameters selected by the end-user from the first set of parameters;

means for displaying results of the first iteration of the parametric search simultaneously with a second set of parameters selectable by the end-user for a second iteration of the parametric search on the selected subcategory of records, the displayed results including the display of the number of database entries that match the parameters selected by the end-user from the first set of parameters, wherein the second set of parameters includes parameters in the first set of parameters and parameters not included in the first set of parameters;

means for parametrically searching the electronic database with the parametric search engine without initially converting the database to a standard format using the first data definition file to generate database queries based on parameters selected by the end-user from the second set of parameters;

means for displaying results of the second iteration of the parametric search;

means for receiving at the parametric search engine a second data definition file that describes a new structure for the electronic database, wherein the second data definition file is stored separately from the parametric search engine;

means for parametrically searching the electronic database with the parametric search engine without converting the database to a standard format using the second data definition file to generate database queries;

means for electronically downloading the electronic database; and the means for parametrically searching the electronic database comprises means for parametrically searching the electronic database without re-downloading the electronic database.

15. The system defined in claim 14, wherein the system further comprises:

means for receiving at the parametric search engine a data definition file that describes the structure of a second electronic database, wherein the data definition file for the second electronic database is stored separately from the parametric search engine; and means for parametrically searching the second electronic database with the parametric search engine without converting the database to a standard format using the data definition file for the second electronic database to generate database queries.

16. The system defined in claim 14, further comprising means for prompting the user to enter search parameters for parametrically searching the electronic database using a user access device.

17. The system defined in claim 14, wherein the electronic database is maintained by a user.

18. The system defined in claim 14, further comprising:

means for receiving the electronic database; and means for storing the electronic database on a server remote from a user.

19. The system defined in claim 18, wherein the system further comprises:

means for providing database queries to a database engine that is remote from the user; and means for parametrically searching the electronic database on the remote server with the database engine using the queries.

20. The system defined in claim 18, wherein the system further comprises:

means for providing database queries to a database engine that is local to the user; and means for parametrically searching the electronic database on the remote server with the database engine using the queries.

21. The system of claim 14, further comprising:

means for receiving interface definitional information from a user access device;

means for generating an interface for an end-user in accordance with the interface definitional information to allow the end-user to parametrically search an electronic database using the parametric search engine;

means for receiving search commands from the end-user;

means for performing a parametric search using the parametric search engine in response to the search commands; and means for displaying results of the parametric search to the end-user.

22. The system defined in claim 21, further comprising means for prompting the end-user to enter search commands using an access device associated with the end-user for parametrically searching the electronic database.

23. The system defined in claim 21, further comprising means for prompting the user to select a format for displaying the results of the parametric search using the user access device.

24. The system defined in claim 23, further comprising means for displaying the results of the parametric search to the end-user on an access device associated with the end-user in accordance with the format selected by the user.

25. The system defined in claim 21, further comprising:

means for receiving the electronic database; and means for storing the electronic database on a server remote from the user.

26. The system defined in claim 21, wherein the electronic database is maintained by the user.

27. A system for performing parametric searches on an electronic database without converting the database to a standard format, comprising:

a parametric search engine configured to:

receive a first data definition file that describes the structure of records in an electronic database, wherein the first data definition file is stored separately from the parametric search engine;

receive a user selection to perform a parametric search on a subcategory of records in the electronic database;

display a first set of search parameters selectable by an end-user for a first iteration of the parametric search on the selected subcategory of records;

parametrically search the electronic database without initially converting the database to a standard format using first data definition file to generate database queries based on parameters selected by the end-user from the first set of parameters;

display results of the first iteration of the parametric search simultaneously with a second set of parameters selectable by the end-user for a second iteration of the parametric search on the selected subcategory of records, the displayed results including the display of the number of database entries that match the parameters selected by the end-user from the first set of parameters, wherein the second set of parameters includes parameters in the first set of parameters and parameters not included in the first set of parameters;

parametrically search the electronic database with the parametric search engine without initially converting the database to a standard format using the first data definition file to generate database queries based on parameters selected by the end-user from the second set of parameters;

display results of the second iteration of the parametric search;

receive a second data definition file that describes a new structure for the records in the electronic database, wherein the second data definition file is stored separately from the parametric search engine;

parametrically search the electronic database without converting the database to a standard format using the second data definition file to generate database queries;

a user access device configured to receive the first and second data definition files from a user and provide the first and second data definition files to the parametric search engine;

electronically download the electronic database; and;

parametrically search the electronic database using the second data definition file without re-downloading the electronic database.

28. The system defined in claim 27, wherein the parametric search engine is further configured to:

receive a data definition file that describes the structure of a second electronic database, wherein the data definition file for the second electronic database is stored separately from the parametric search engine; and parametrically search the second electronic database without converting the database to a standard format using the data definition file for the second electronic database to generate database queries.

29. The system defined in claim 27, wherein the user access device is further configured to prompt the user to enter search parameters for parametrically searching the electronic database.

30. The system defined in claim 27, wherein the electronic database is maintained by the user.

31. The system defined in claim 27, further comprising a server configured to:
   receive the electronic database; and
   store the electronic database.

32. The system defined in claim 31, wherein:
   the server is further configured to provide database queries to a database engine that is remote from the user, wherein the database engine is configured to parametrically search the electronic database with the first and second data definition files.

33. The system defined in claim 31, wherein:
   the server is further configured to provide database queries to a database engine that is local to the user, wherein the database engine is configured to parametrically search the electronic database with the first and second data definition files.

34. The system of claim 27, further comprising:
   a server configured to:
      receive interface definitional information from the user access device;
      generate an interface for an end-user in accordance with the interface definitional information to allow the end-user to parametrically search an electronic database using the parametric search engine;
      receive search commands from an access device associated with the end-user;
      perform a parametric search using the parametric search engine in response to the search commands;
      provide results of the parametric search to the access device associated with the end-user; and
   wherein the access device associated with the end-user is configured to display the results of the parametric search to the end-user.

35. The system defined in claim 34, wherein the access device associated with the end-user is configured to prompt the end-user to enter search commands for parametrically searching the electronic database.

36. The system defined in claim 34, wherein the user access device is configured to prompt the user to select a format for displaying the results of the parametric search.

37. The system defined in claim 36, wherein the access device associated with the end-user is configured to display the results of the parametric search to the end-user in accordance with the format selected by the user.

38. The system defined in claim 34, wherein the server is further configured to:
   receive the electronic database; and
   store the electronic database.

39. The system defined in claim 34, wherein the electronic database is maintained by the user.

\* \* \* \* \*

UNITED STATES PATENT AND TRADEMARK OFFICE
CERTIFICATE OF CORRECTION

PATENT NO. : 6,988,095 B1
APPLICATION NO. : 09/850556
DATED : January 17, 2006
INVENTOR(S) : Andrew S. Dorfman Page 1 of 1

It is certified that error appears in the above-identified patent and that said Letters Patent is hereby corrected as shown below:

On Title Page
Column References Cited, Item 56, in patent reference "5,983,219", change "707/5" to --707/3--.

In Drawings, Sheet 12 of 48, 4$^{th}$ box down, change "OR" to --OF--.

Column 11, line 51, change "end-user' s" to --end-user's--.

Column 17, line 51, change "show" to --shown--.

Column 19, line 41, change "transmits" to --transmit-- and "selection" to --selections--.

Signed and Sealed this

Thirteenth Day of March, 2007

JON W. DUDAS
*Director of the United States Patent and Trademark Office*